US008384322B2

(12) United States Patent
Tomigashi

(10) Patent No.: US 8,384,322 B2
(45) Date of Patent: Feb. 26, 2013

(54) MOTOR CONTROL DEVICE AND MOTOR DRIVE SYSTEM

(75) Inventor: Yoshio Tomigashi, Hirakata (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 349 days.

(21) Appl. No.: 12/818,654

(22) Filed: Jun. 18, 2010

(65) Prior Publication Data

US 2011/0309781 A1 Dec. 22, 2011

(30) Foreign Application Priority Data

Jun. 18, 2009 (JP) ................................. 2009-145183

(51) Int. Cl.
*H02P 21/12* (2006.01)
(52) U.S. Cl. ............... 318/400.02; 318/400.32; 318/504
(58) Field of Classification Search ............. 318/400.02, 318/400.3, 400.32, 479, 504
See application file for complete search history.

(56) References Cited

U.S. PATENT DOCUMENTS

| 6,841,969 | B1 | 1/2005 | Schulz et al. | |
|---|---|---|---|---|
| 6,900,613 | B2 * | 5/2005 | Hirono | 318/722 |
| 6,984,957 | B2 * | 1/2006 | Tajima et al. | 318/400.02 |
| 7,898,197 | B2 * | 3/2011 | Tomigashi | 318/400.02 |
| 8,073,600 | B2 * | 12/2011 | Kaneko et al. | 701/54 |
| 8,174,220 | B2 * | 5/2012 | Inoue et al. | 318/400.02 |
| 2005/0096793 | A1 | 5/2005 | Takeuchi | |
| 2007/0007072 | A1 | 1/2007 | Ta et al. | |
| 2008/0079377 | A1 | 4/2008 | Williams et al. | |

FOREIGN PATENT DOCUMENTS

| EP | 1940016 A1 | 7/2008 |
|---|---|---|
| JP | 08322300 A | 12/1996 |
| JP | 2000312499 A | 11/2000 |
| JP | 2006141095 | 6/2006 |
| JP | 2006204054 | 8/2006 |
| JP | 2006254572 | 9/2006 |
| JP | 2007259686 | 10/2007 |

OTHER PUBLICATIONS

European Search Report issued on Oct. 1, 2010 in the corresponding to European Patent Application No. 10006307.2-2207.

* cited by examiner

*Primary Examiner* — Bentsu Ro
(74) *Attorney, Agent, or Firm* — NDQ&M Watchstone LLP

(57) ABSTRACT

Provided is a motor control device including a voltage specifying unit which generates a specified voltage signal indicating a target value of an applied voltage to a motor on the basis of a specified current signal indicating a target value of supplied current to the motor, so as to control the motor in accordance with the specified voltage signal. An update unit is further provided, which sequentially updates a specified field current signal that is a field current component of the specified current signal to be given to the voltage specifying unit on the basis of difference information between a value of the specified voltage signal and a limit voltage value defined as an upper limit value of the applied voltage. The update unit includes a low pass filter. The specified field current signal after the update is generated on the basis of a signal obtained by passing the specified field current signal before the update through the low pass filter and the difference information. Otherwise, the specified field current signal after the update is generated on the basis of a signal obtained by passing an intermediate signal derived from the specified field current signal before the update and the difference information through the low pass filter.

14 Claims, 18 Drawing Sheets

MOTOR CONTROL DEVICE AND MOTOR DRIVE SYSTEM

This nonprovisional application claims priority under 35 U.S.C. §119(a) on Patent Application No. 2009-145183 filed in Japan on Jun. 18, 2009, the entire contents of which are hereby incorporated by reference.

BACKGROUND OF THE INVENTION

1. Field of the Invention

The present invention relates to a motor control device which controls a motor and a motor drive system.

2. Description of Related Art

When vector control is performed for a permanent magnet synchronous motor, a control axis to be rotated in synchronization with rotation of the motor is defined in a motor control device, so that current information and voltage information are controlled on the control axis for realizing desired vector control.

When the motor rotates at high speed, flux-weakening control (field-weakening control) is usually used so as to suppress an excessive increase in an induction voltage (i.e., electromotive force) that is generated in the motor due to the magnetic flux of a permanent magnet and the high speed rotation. Under the general flux-weakening control, on the assumption that there is no difference between the control axes and dq axes, d-axis current (field current) that is a field current component of current supplied to the motor is controlled on the basis of motor parameters. The motor parameters include a d-axis inductance of the motor, a q-axis inductance of the motor, an armature flux linkage by the permanent magnet, and the like.

It is required to realize stable flux-weakening control even if the control axes and the dq axes are shifted from each other, or if the motor parameters vary due to magnetic saturation or the like, or if the motor parameters include an error. In particular, if the motor is driven in an overmodulation region, it is required to control a voltage value applied to the motor to be precisely below a predetermined limit voltage value.

However, if a change or the like of the motor parameters occurs in the conventional system, too much or too little weakening magnetic flux is generated because of the change or the like, so that a desired flux-weakening control is hardly realized. According to a certain conventional method, it is possible to realize flux-weakening control that is not affected by a change in the q-axis inductance. However, this conventional method is not still sufficient as a measure against an error in the d-axis inductance and the armature flux linkage, or a change in the motor parameters due to magnetic saturation.

On the other hand, there is a method of generating a specified d-axis current value to be a target of the d-axis current (specified field current value) by using proportional-plus-integral control (hereinafter referred to as PI control). For instance, in a certain conventional method, the specified d-axis current value $i_d{}^*$ is calculated so that $\sqrt{(V_{om}{}^2 - v_d{}^{*2})} - v_q{}^*$ becomes zero, so as to control a magnitude of an actual specified voltage value (in other words, a magnitude of an actual specified voltage signal) $\sqrt{(v_d{}^{*2} + v_q{}^{*2})}$ to be a limit voltage value $V_{om}$ or lower.

However, in the actual system, it is required that the specified d-axis current value $i_d{}^*$ does not exceed a predetermined limit value. Therefore, in the method of using the PI control, it is necessary to take a countermeasure of suppressing occurrence of a windup phenomenon when an output of the PI controller is limited by a limit value. This countermeasure may complicate a process algorithm of an integrator in the PI controller. The same problem may occur also in the case where the vector control to be performed is switched between the flux-weakening control and maximum torque control. The windup phenomenon is known as a phenomenon that an internal signal of the integrator in the PI controller diverges. Note that the configuration of using the PI control will be also described later as a comparison with a configuration according to the present invention.

The problem of the conventional method is described above by noting the specified d-axis current value related to the flux-weakening control, but other control values than the specified d-axis current value (specified value or state quantity indicating voltage, current, torque or speed) are also generated by using the PI controller in general. In addition, the control values are also required not to exceed a predetermined limit value. Therefore, also in the case where the PI controller is used for calculation of the control value other than the specified d-axis current value, it is necessary to take a countermeasure of suppressing occurrence of the a windup phenomenon. As a result, the process algorithm of the integrator in the PI controller is complicated.

SUMMARY OF THE INVENTION

A motor control device according to a first aspect of the present invention includes a voltage specifying unit which generates a specified voltage signal indicating a target value of an applied voltage to a motor on the basis of a specified current signal indicating a target value of supplied current to the motor, so as to control the motor in accordance with the specified voltage signal. An update unit is further provided, which sequentially updates a specified field current signal that is a field current component of the specified current signal to be given to the voltage specifying unit on the basis of difference information between a value of the specified voltage signal and a limit voltage value defined as an upper limit value of the applied voltage. The update unit includes a low pass filter. The specified field current signal after the update is generated on the basis of signal obtained by passing the specified field current signal before the update through the low pass filter and the difference information. Otherwise, the specified field current signal after the update is generated on the basis of a signal obtained by passing an intermediate signal derived from the specified field current signal before the update and the difference information through the low pass filter.

Specifically, for example, a candidate signal generation unit which generates a candidate signal as a candidate of the specified field current signal after the update by using the low pass filter, and a limit unit which generates the specified field current signal after the update by limiting a value of the generated candidate signal to a predetermined limit value are disposed in the update unit, and the candidate signal generation unit generates the candidate signal by correcting the signal obtained by passing the specified field current signal before the update through the low pass filter on the basis of the difference information, or by correcting the specified field current signal before the update on the basis of the difference information so as to pass the corrected signal through the low pass filter.

For instance, it is preferable that the limit value is a field current component value of the current to be supplied to the motor for realizing the maximum torque control.

Specifically, for example, the update unit estimates a disturbance magnetic flux from the difference information and rotation speed information of the motor, and the specified field current signal after the update is generated via the process of correcting the signal obtained by passing the specified field current signal before the update through the low pass filter on the basis of the estimated disturbance magnetic flux, or the specified field current signal after the update is generated via the process of correcting the specified field current signal before the update on the basis of the estimated disturbance magnetic flux so as to pass the corrected signal through the low pass filter.

For instance, the update unit changes the limit voltage value in accordance with a change state of rotation speed of the motor.

More specifically, for example, a predetermined first voltage value is used as the limit voltage value in a period while the rotation speed of the motor is changing and in a period until a predetermined time passes after the time point of transition from the state where the rotation speed of the motor is changing to the state where the rotation speed of the motor is maintained to be a constant speed, while a second voltage value that is larger than the first voltage value is used as the limit voltage value in the other period.

For instance, the second voltage value is, or the first and the second voltage values are a voltage value in an overmodulation region, and the voltage value in the overmodulation region means a value of voltage to be applied to the motor when an inverter that drives the motor performs the overmodulation.

A motor control device according to a second aspect of the present invention includes a voltage specifying unit which generates a specified voltage signal indicating a target value of an applied voltage to a motor on the basis of difference information between a target value of supplied current to the motor and a detection value or an estimated value of the supplied current, so as to control the motor in accordance with the specified voltage signal. The voltage specifying unit sequentially updates the specified voltage signal to be generated. A candidate signal generation unit which generates a candidate signal as a candidate of the specified voltage signal after the update by using a low pass filter, and a limit unit which imposes a predetermined limit on the generated candidate signal value so as to generate the specified voltage signal after the update are disposed in the voltage specifying unit. The candidate signal generation unit generates the candidate signal by correcting a signal obtained by passing the specified voltage signal before the update through the low pass filter on the basis of the difference information, or by correcting the specified voltage signal before the update on the basis of the difference information so as to pass the corrected signal through the low pass filter.

A motor control device according to a third aspect of the present invention includes a specifying unit which generates a specified torque current signal indicating a target value of a torque current component of supplied current to a motor or a specified torque signal indicating a target value of a torque generated by the motor on the basis of difference information between a target value of rotation speed of the motor and a detection value or an estimated value of the rotation speed, so as to control the motor in accordance with the specified torque current signal or the specified torque signal. The specifying unit sequentially updates the specified torque current signal or the specified torque signal to be generated. A candidate signal generation unit which generates a candidate signal as a candidate of the specified torque current signal or the specified torque signal after the update by using a low pass filter, and a limit unit which generates the specified torque current signal or the specified torque signal after the update by limiting a value of the generated candidate signal to a predetermined limit value are disposed in the specifying unit. The candidate signal generation unit generates the candidate signal by correcting a signal obtained by passing the specified torque current signal or the specified torque signal before the update through the low pass filter on the basis of the difference information, or by correcting the specified torque current signal or the specified torque signal before the update on the basis of the difference information so as to pass the corrected signal through the low pass filter.

A motor control device according to a fourth aspect of the present invention includes an estimation unit which estimates a rotation speed of a motor on the basis of an axial error between a rotation axis synchronizing with rotation of the motor and an estimated axis of the rotation axis, and which generates an estimated speed signal indicating the estimated rotation speed, so as to control the motor by using the estimated speed signal. The estimation unit sequentially updates the estimated speed signal to be generated. A candidate signal generation unit which generates a candidate signal as a candidate of the estimated speed signal after the update by using a low pass filter, and a limit unit which limits a value of the generated candidate signal to a predetermined limit value so as to generate the estimated speed signal after the update are disposed in the estimation unit. The candidate signal generation unit generates the candidate signal by correcting a signal obtained by passing the estimated speed signal before the update through the low pass filter on the basis of the axial error, or by correcting the estimated speed signal before the update on the basis of the axial error so as to pass the corrected signal through the low pass filter.

In addition, for example, it is possible to constitute a motor drive system including a motor, an inverter which drives the motor, and any one of the above-mentioned motor control devices, which controls drive of the motor via the inverter.

Meanings and effects of the present invention will be further apparent from the following description of the embodiments. However, the embodiments described below are merely examples of the present invention. Meanings of the present invention and terms of the elements thereof are not limited to those described in the following description of the embodiments.

DETAILED DESCRIPTION OF THE PREFERRED EMBODIMENTS

Figure 1:
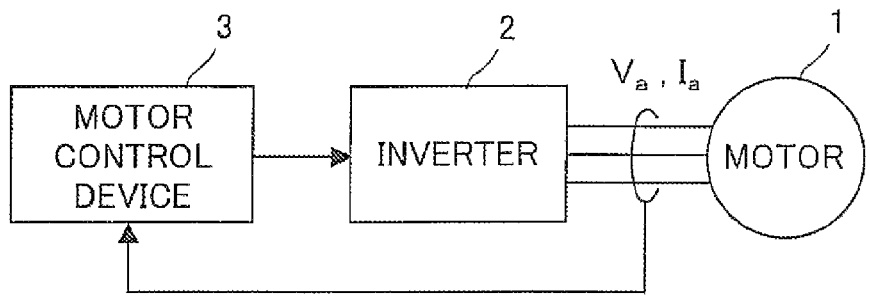
FIG. 1 is a general block diagram of a motor drive system according to an embodiment of the present invention.

Hereinafter, embodiments of the present invention will be described specifically with reference to the attached drawings. In the drawings to be referred to, the same part is denoted by the same numeral or symbol so that overlapping description of the same part is omitted as a rule. Before describing first to sixth embodiments, matters that are common to the individual embodiments or matters that are referred to in the individual embodiments will be described first.

FIG. 1 is a general block diagram of a motor drive system according to an embodiment of the present invention. The motor drive system illustrated in FIG. 1 includes a motor 1, a pulse width modulation (PWM) inverter 2, and a motor control device 3.

The motor 1 is a three-phase permanent-magnet synchronous motor including a rotor (not shown) having a permanent magnet and a stator (not shown) having armature windings of three phases. In the following description, the armature winding means one disposed in the motor 1. The motor 1 may be an interior permanent-magnet synchronous motor or may be a surface magnet synchronous motor. The motor 1 may be any one of a salient pole machine and a non-salient pole machine. In the following description, it is supposed that the motor 1 is a salient pole machine.

The PWM inverter (hereinafter simply referred to as an inverter) 2 supplies a three-phase AC voltage to the motor 1 in accordance with a rotor position of the motor 1. The three-phase AC voltage supplied to the motor 1 by the inverter 2 includes a U-phase voltage $v_u$ that is an applied voltage to a U-phase armature winding, a V-phase voltage $v_v$ that is an applied voltage to a V-phase voltage armature winding, and a W-phase voltage $v_w$ that is an applied voltage to a W-phase armature winding. A total applied voltage to the motor 1, which is a combination voltage of the U-phase voltage $v_u$, the V-phase voltage $v_v$ and the W-phase voltage $v_w$, is referred to as a motor voltage (motor terminal voltage) and is denoted by symbol $V_a$.

A U-phase component, a V-phase component and a W-phase component of the current supplied from the inverter 2 to the motor 1 by application of the motor voltage $V_a$, i.e., currents flowing in the U-phase, the V-phase and the W-phase armature windings are referred to as U-phase current $i_u$, V-phase current $i_v$ and W-phase current $i_w$, respectively. Total supplied current to the motor 1, which is combination current of the U-phase current $i_u$, the V-phase current $i_v$ and the W-phase current $i_w$, is referred to as motor current (armature current) and is denoted by symbol $I_a$.

The motor control device 3 applies a PWM signal for realizing desired vector control to the inverter circuit 2 on the basis of a detection value of the motor current $I_a$ or the like.

Figure 2A:
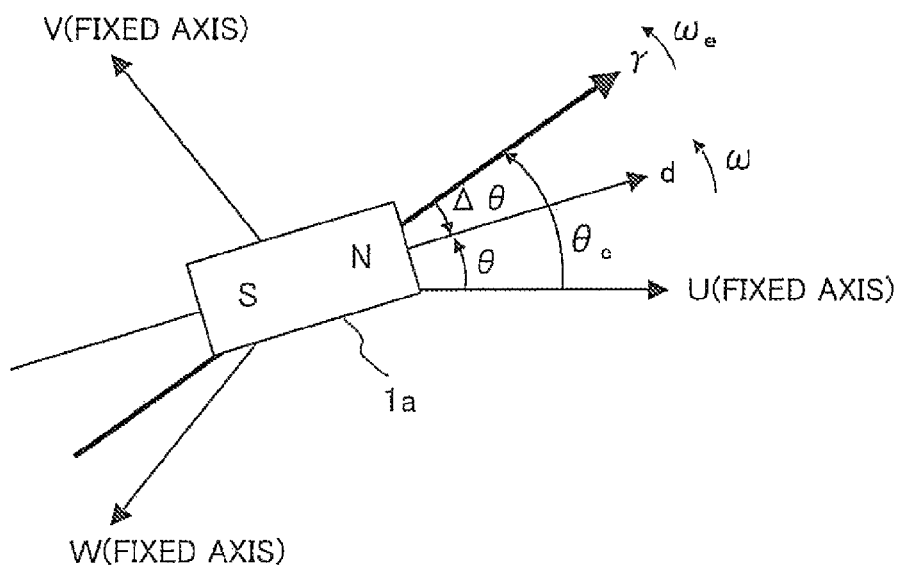
FIGS. 2A and 2B are analysis model diagrams of the motor illustrated in FIG. 1.
Figure 2B:
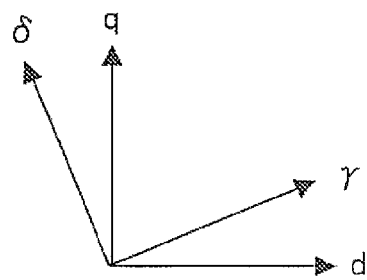

FIGS. 2A and 2B are analysis model diagrams of the motor 1. FIG. 2A illustrates a U-phase, a V-phase and a W-phase armature winding fixed axes. In FIG. 2A, numeral 1a denotes a permanent magnet provided to the rotor of the motor 1. In a rotation coordinate system rotating at a rotation speed that is the same as that of a magnetic flux generated by a permanent magnet 1a, an axis along to the direction of the magnetic flux generated by the permanent magnet 1a is referred to as a d-axis and a rotation axis for control corresponding to the d-axis is a γ-axis. The direction of the d-axis agrees with a direction of the magnetic flux generated by the permanent magnet 1a. In addition, as illustrated in FIG. 2B, an axis leading the d-axis by 90 degrees in electric angle is referred to as a q-axis, and an axis leading the γ-axis by 90 degrees in electric angle is referred to as a δ-axis. In FIGS. 2A and 2B, the anticlockwise direction corresponds to the phase leading direction. The d-axis and the q-axis are generically referred to as dq axes, and a coordinate system having the d-axis and the q-axis as coordinate axes is referred to as a dq coordinate system. The γ-axis and the δ-axis are generically referred to as γδ axes, and a coordinate system having the γ-axis and the δ-axis as coordinate axes is referred to as a γδ coordinate system.

The dq axes and the dq coordinate system are rotating, and a rotation speed thereof is denoted by symbol $\omega$. The γδ axes and γδ coordinate system are also rotating, and a rotation speed thereof is denoted by symbol $\omega_e$. In addition, in the dq axes, an angle (phase) of the d-axis viewed from the U-phase armature winding fixed axis is denoted by symbol $\theta$. Similarly, in the γδ axes, an angle (phase) of the γ-axis viewed from the U-phase armature winding fixed axis is denoted by symbol $\theta_e$. The angles denoted by $\theta$ and $\theta_e$ are angles in electric angle, which are also referred to as rotor positions or magnetic pole positions in general. The rotation speeds denoted by ω and $\omega_e$ are angular velocities in electric angle. An axial error Δθ between the d-axis and the γ-axis is expressed by $\Delta\theta = \theta - \theta_e$.

Hereinafter, θ or $\theta_e$ is referred to as a rotor position, and ω or $\omega_e$, is referred to as a rotation speed. The γ-axis and δ-axis that are rotation axes for control are also referred to as control axes. If the rotor position and the rotation speed are derived by estimation, the γ-axis and the δ-axis can be referred to as estimation axes for control, $\theta_e$ and $\omega_e$ can be referred to as an estimated rotor position and an estimated rotation speed, respectively.

The motor control device 3 performs vector control so that θ and $\theta_e$ agree with each other. When θ and $\theta_e$ agree with each other, the d-axis and the q-axis agree with the γ-axis and the δ-axis, respectively.

Symbols related to control of the motor drive system are defined as follows.

The γ-axis component and the δ-axis component of the motor voltage $V_a$ are respectively referred to as a γ-axis voltage and a δ-axis voltage, and are denoted by symbols $v_\gamma$ and $v_\delta$.

The γ-axis component and the δ-axis component of the motor current $I_n$ are respectively referred to as γ-axis current and a δ-axis current, and are denoted by symbols $i_\gamma$ and $i_\delta$.

Symbol $\Phi_a$ denotes an armature flux linkage (armature reaction flux linkage) by the permanent magnet 1a.

Symbols $L_d$ and $L_q$ denote d-axis inductance (a d-axis component of inductance of the armature winding) and q-axis inductance (a q-axis component of inductance of the armature winding), respectively.

Symbol $R_a$ denotes a resistance per phase of the armature winding.

Symbols $\Phi_a$, $L_d$, $L_q$ and $R_a$ denote motor parameters determined in advance in accordance with a characteristic of the motor 1.

Target values of a γ-axis voltage $v_\gamma$ and a δ-axis voltage $v_\delta$ that the γ-axis voltage $v_\gamma$ and the δ-axis voltage $v_\delta$ should follow are referred to as a specified γ-axis voltage value $v_\gamma^*$ and a specified δ-axis voltage value $v_\delta^*$ respectively.

Target values of a γ-axis current $i_\gamma$ and a δ-axis current $i_\delta$ that the γ-axis current $i_\gamma$ and the δ-axis current $i_\delta$ should follow are referred to as a specified γ-axis current value $i_\gamma^*$ and a specified δ-axis current value $i_\delta^*$, respectively.

A target value of a rotation speed $\omega_e$ that the rotation speed $\omega_e$ should follow is referred to as a specified rotation speed value ω*. The specified rotation speed value ω* may also be referred to as a rotation speed.

Note that $i_\gamma$ is also used as a symbol that denotes a γ-axis current value. The same is true for symbols other than $i_\gamma$, which denote state quantities or specified values. In addition, in this specification, for simple description, symbols (e.g., $i_\gamma$) are used and names of the state quantities or the like corresponding to the symbols may be omitted or abbreviated. For instance, in this specification, the γ-axis current is expressed like "$i_\gamma$", "current $i_\gamma$" or "γ-axis current $i_\gamma$", and a value of the γ-axis current is expressed like "$i_\gamma$", "current value $i_\gamma$" or "γ-axis current value $i_\gamma$".

In addition, a signal having the specified value $i_\gamma^*$ and/or $i_\delta^*$ as the signal value may be referred to as a specified current signal, and signals having specified values $i_\gamma^*$ and $i_\delta^*$ as signal values may be referred to as a specified γ-axis current signal and a specified δ-axis current signal, respectively. In addition, signals having the specified values $i_\gamma^*$ and $i_\delta^*$ as signal values may be referred to as a specified γ-axis current signal $i_\gamma^*$ and a specified δ-axis current signal $i_\delta^*$, respectively. Similarly, a signal having the specified value $v_\gamma^*$ and/or $v_\delta^*$ as the signal value may be referred to as a specified voltage signal, and signals having specified values $v_\gamma^*$ and $v_\delta^*$ as the signal values may be referred to as a specified γ-axis voltage signal and a specified δ-axis voltage signal, respectively. In addition, signals having the specified values $v_\gamma^*$ and $v_\delta^*$ as the signal values may be referred to as a specified γ-axis voltage signal $v_\gamma^*$ and a specified δ-axis voltage signal $v_\delta^*$, respectively. The same is true for other specified values and state quantities.

In the motor control device 3, the vector control is performed so that a γ-axis voltage value $v_\gamma$ and a δ-axis voltage value $v_\delta$ respectively follow the specified γ-axis voltage value $v_\gamma^*$ and the specified δ-axis voltage value $v_\delta^*$, and that γ-axis current value $i_\gamma$ and δ-axis current value $i_\delta$ respectively follow the specified γ-axis current value $i_\gamma^*$ and the specified δ-axis current value $i_\delta^*$.

First Embodiment

Figure 3:
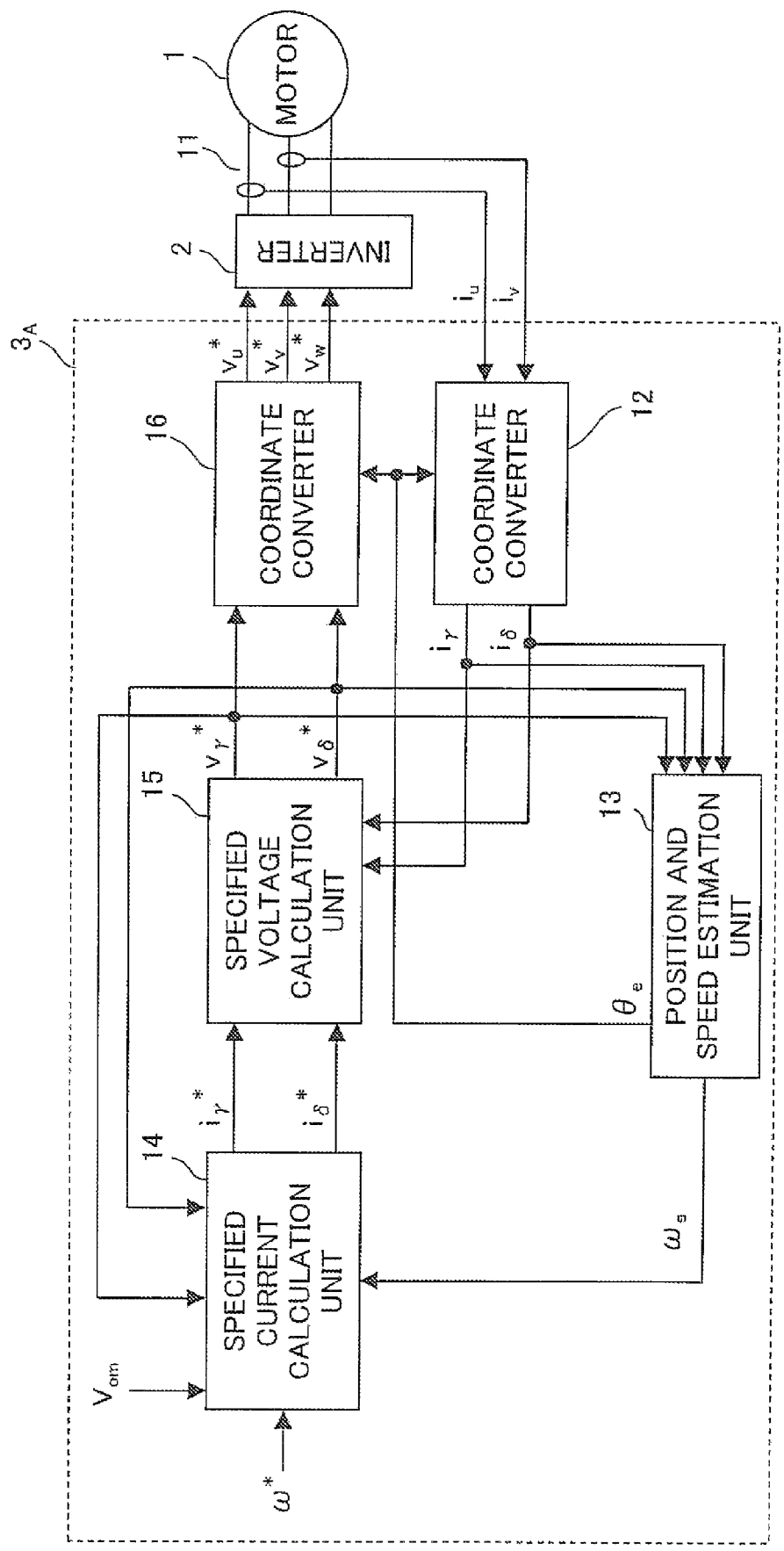
FIG. 3 is a detail block diagram of a motor drive system according to a first embodiment of the present invention.

A first embodiment of the present invention will be described. FIG. 3 is a detail block diagram of a motor drive system according to the first embodiment. The motor drive system illustrated in FIG. 3 includes the motor 1 and the inverter 2 illustrated in FIG. 1, a motor control device $3_A$ which functions as the motor control device 3 illustrated in FIG. 1, and a phase current sensor 11. The motor control device $3_A$ is constituted so as to include individual units denoted by numerals 12 to 16. It is also possible to consider that the motor control device $3_A$ includes the phase current sensor 11 (the same is true in other embodiments described later). The individual units in the motor control device $3_A$ can freely use numerical values generated in the motor control device $3_A$ (the same is true in other embodiments described later).

The individual units constituting the motor drive systems of this embodiment and other embodiments described later sequentially updates specified values ($i_\gamma^*$, $i_\delta^*$, $v_\gamma^*$, $v_\delta^*$ and the like) and the state quantities ($i_u$, $i_v$, $i_\gamma$, $i_\delta$, $\theta_e$, $\omega_e$ and the like) calculated (or detected) and output by themselves at a predetermined update period so as to perform necessary calculations using the latest numerical values. In addition, the individual units constituting the motor drive systems of this embodiment and other embodiments described later calculate specified values or state quantities by using the motor parameters (including $\Phi_a$, $L_d$, $L_q$ and $R_a$) of the motor 1 as necessity.

The phase current sensor 11 includes two current transformers or the like disposed between the inverter 2 and the motor 1 and detects a U-phase current value $i_u$ and a V-phase current value $i_v$ that are fixed axis components of the motor current $I_n$ supplied from the inverter 2 to the motor 1. Note that a W-phase current value $i_w$ is calculated from the relationship equation "$i_w = i_u - i_v$".

The coordinate converter 12 performs coordinate conversion of a U-phase current value $i_u$ and a V-phase current value $i_v$ into current values on the γδ axes on the basis of a rotor position $\theta_e$ from the position and speed estimation unit 13 so as to calculate the γ-axis current value $i_\gamma$ and the δ-axis current value $i_\delta$.

The position and speed estimation unit 13 estimates the axial error Δθ (see FIG. 2A) on the basis of the γ-axis current value $i_\gamma$ and the δ-axis current value $i_\delta$ from the coordinate converter 12 and the specified γ-axis voltage value $v_\gamma^*$ and the specified δ-axis voltage value $v_\delta^*$ from the specified voltage calculation unit 15, and derives the rotor position $\theta_e$ and the rotation speed $\omega_e$ so that the axial error Δθ converges to zero by using proportional-plus-integral control (PI control) or the like. Since the control is performed so that the axial error Δθ becomes zero, in this embodiment, γδ axes are made to follow the dq axes (i.e., estimation of the dq axes is performed).

The specified current calculation unit 14 calculates speed deviation $(\omega^*-\omega_e)$ on the basis of the rotation speed $\omega_e$ from the position and speed estimation unit 13 and the specified rotation speed value $\omega^*$ from a specified rotation speed value generation unit (not shown) disposed outside or inside the motor control device $3_A$, and calculates the specified δ-axis current value $i_\delta^*$ so that the speed deviation $(\omega^*-\omega_e)$ converges to zero by using the PI control or the like so as to output the result. On the basis of $v_\gamma^*$ and $v_\delta^*$ from the specified voltage calculation unit 15 and the like, the specified current calculation unit 14 calculates the specified γ-axis current value $i_\gamma^*$ too. The calculation method will be described later.

The specified voltage calculation unit 15 performs current feedback control by using the PI control or the like so that both the current errors $(i_\gamma^*-i_\gamma)$ and $(i_\delta^*-i_\delta)$ based on $i_\gamma^*, i_\delta^*$, $i_\gamma$ and $i_\delta$ from the specified current calculation unit 14 and the coordinate converter 12 converge to zero. Thus, the specified voltage calculation unit 15 calculates the specified γ-axis voltage value $v_\gamma^*$ and the specified δ-axis voltage value $v_\delta^*$. When $v_\gamma^*$ and $v_\delta^*$ are calculated, $\omega_e, i_\gamma$ and $i_\delta$ are also referred to.

The coordinate converter 16 performs coordinate conversion of $v_\gamma^*$ and $v_\delta^*$ given from the specified voltage calculation unit 15 on three-phase fixed coordinate axes on the basis of the rotor position $\theta_e$ from the position and speed estimation unit 13. Thus, the coordinate converter 16 calculates the specified three-phase voltage values and outputs the same. The specified three-phase voltage values includes specified U-phase, V-phase and W-phase voltage values $v_u^*, v_v^*$ and $v_w^*$ that specifies U-phase, V-phase and W-phase voltage values $v_u, v_v$ and $v_w$. The inverter 2 supplies motor current $I_a$ according to the specified three-phase voltage values to the motor 1 for controlling the motor 1, so that actual U-phase. V-phase and W-phase voltage values $v_u, v_v$ and $v_w$ respectively agree with the specified U-phase, V-phase and W-phase voltage values $v_u^*, v_v^*$ and $v_w^*$.

As described above in the description of the background art, the flux-weakening control is used when the permanent magnet synchronous motor rotates at high speed. Stable flux-weakening control is required to be realized even if the control axes (γδ axes) and the dq axes are shifter from each other, or if the motor parameters are changed due to magnetic saturation or the like or motor parameters contain errors. However, if a change or the like of motor parameters occurs in the conventional motor drive system, too much or too little weakening magnetic flux may occur because of the change or the like so that a desired flux-weakening control cannot be realized.

In this embodiment, too much or too little of the weakening magnetic flux due to a change or the like of a motor parameters is estimated as a disturbance magnetic flux, and the weakening magnetic flux current (γ-axis current) is corrected by using the estimated disturbance magnetic flux so that the flux-weakening control is performed. Thus, even if a change or the like of motor parameters occurs, a desired weakening magnetic flux can be generated. The estimation of the disturbance magnetic flux is performed by the specified current calculation unit 14 illustrated in FIG. 3.

The estimation method of the disturbance magnetic flux will be described. $\sqrt{(v_\gamma^{*2}+v_\delta^{*2})}$ agrees with amplitude of the motor voltage $V_a$ that is an applied voltage to the motor 1. Therefore, although $v_\gamma^*$ and $v_\delta^*$ are generated in the flux-weakening control so that $\sqrt{(v_\gamma^{*2}+v_\delta^{*2})}$ agrees with a predetermined limit voltage value $V_{om}$, a difference may actually occur between the former and the latter. This difference is considered to be a difference due to the disturbance magnetic flux. The difference between the specified voltage signal $(v_\gamma^*, v_\delta^*)$ and the limit voltage value $V_{om}$ is considered to be caused by the disturbance magnetic flux $\phi_{dis1}, \phi_{dis2}$ or $\phi_{dis3}$ expressed in the following equation (1a), (1b) or (1c). Note that, in this specification, $\sqrt{j}$ expresses the positive square root of j (here, j is an arbitrary positive number).

$$V_{om}=\sqrt{v_\gamma^{*2}+v_\delta^{*2}}+\omega\phi_{dis1} \tag{1a}$$

$$V_{om}=\sqrt{v_\gamma^{*2}+(v_\delta^*+\omega\phi_{dis2})^2} \tag{1b}$$

$$V_{om}=\sqrt{(v_\gamma^*+\omega\phi_{dis3})^2+v_\delta^{*2}} \tag{1c}$$

The disturbance magnetic fluxes $\phi_{dis1}, \phi_{dis2}$ and $\phi_{dis3}$ can be calculated in accordance with the following equations (2a), (2b) and (2c), respectively. The disturbance magnetic flux to be estimated by the specified current calculation unit 14 is denoted by $\phi_{dis}$. The specified current calculation unit 14 can estimates $\phi_{dis1}, \phi_{dis2}$ or $\phi_{dis3}$ as the disturbance magnetic flux $\phi_{dis}$ by using the equation (2a), (2b) or (2c). However, a value $(V_{om}^2-v_\delta^{*2})$ in the square root of the equation (2c) may be negative. Therefore, it is desirable that either one of $\phi_{dis1}$ and $\phi_{dis2}$ is estimated as the disturbance magnetic flux $\phi_{dis}$.

$$\phi_{dis1}=\frac{1}{\omega}\left(V_{om}-\sqrt{v_\gamma^{*2}+v_\delta^{*2}}\right) \tag{2a}$$

$$\phi_{dis2}=\frac{1}{\omega}\left(\sqrt{V_{om}^2-v_\gamma^{*2}}-v_\delta^*\right) \tag{2b}$$

$$\phi_{dis3}=\frac{1}{\omega}\left(\sqrt{V_{om}^2-v_\delta^{*2}}-v_\gamma^*\right) \tag{2c}$$

Figure 4:
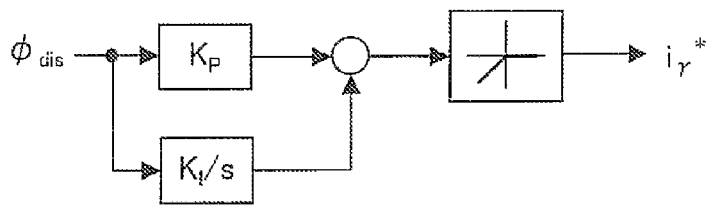
FIG. 4 is a block diagram of a configuration of generating a specified γ-axis current value ($i_\gamma$*) from estimated disturbance magnetic flux ($\phi_{dis}$) by PI control.

If the specified γ-axis current value $i_\gamma^*$ is calculated by using the PI control so that the estimated disturbance magnetic flux $\phi_{dis}$ becomes zero, stable flux-weakening control can be realized without being affected by a change or the like of the motor parameter. As a reference, a block diagram example of a PI controller that performs the PI control as described above is illustrated in FIG. 4. However, in this case, as described above in the description of the background art, an anti-windup measure (a process for suppressing occurrence of a windup phenomenon) will be necessary in the PI controller that performs the PI control, and a process algorithm of an integrator of the PI controller will be complicated in switching between the flux-weakening control and a maximum torque control.

Figure 5:
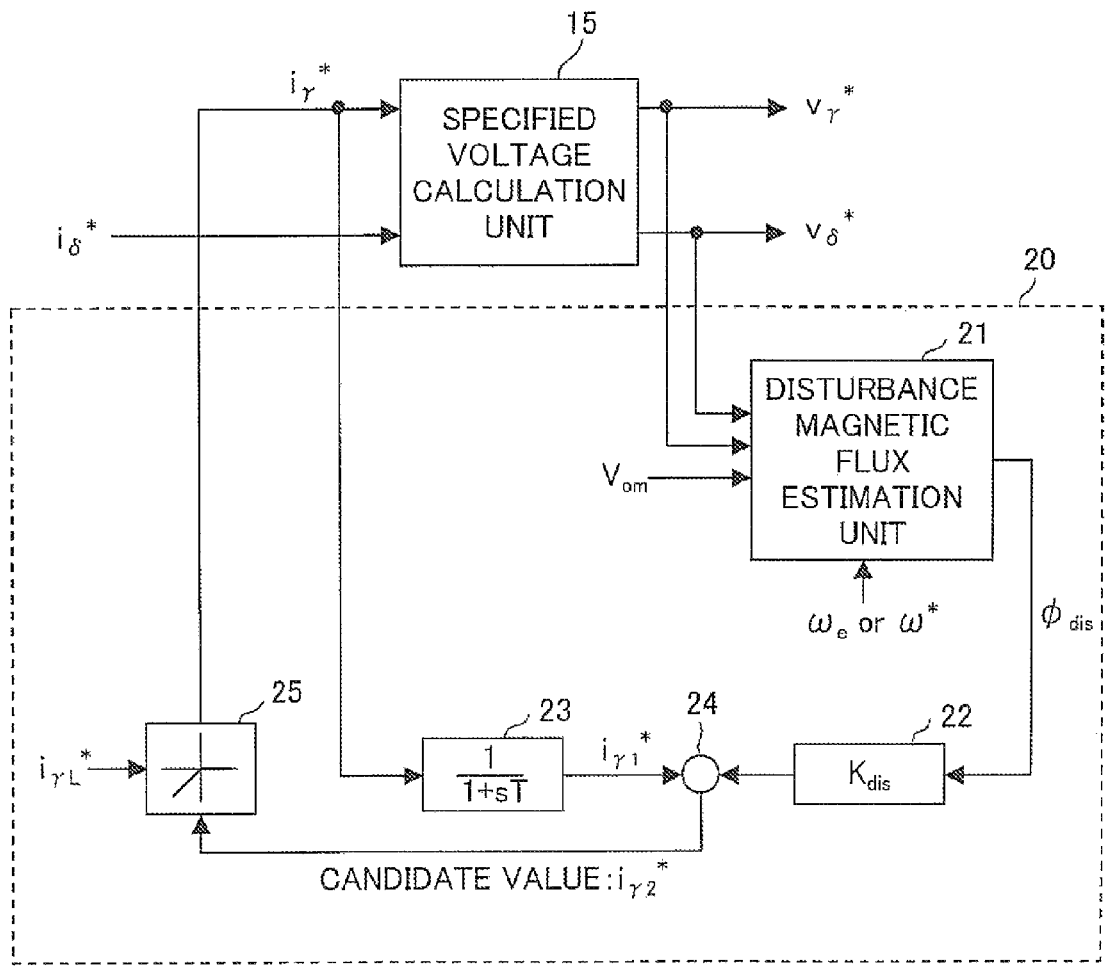
FIG. 5 is a block diagram of a part that is particularly related to generation of the specified γ-axis current value ($i_\gamma$*) according to the first embodiment of the present invention.
Figure 6:
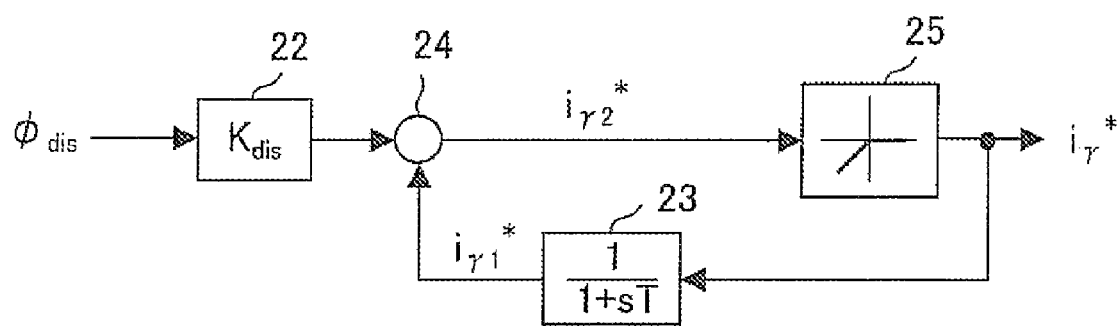
FIG. 6 is a block diagram of a part of an $i_\gamma$* update unit illustrated in FIG. 5.

Considering this, the motor control device $3_A$ according to the first embodiment adopts a generation method of the specified γ-axis current value $i_\gamma^*$ without using the PI controller. FIG. 5 is a block diagram of a part of the motor control device $3_A$ that is particularly related to generation of the specified γ-axis current value $i_\gamma^*$. In FIG. 5, numeral 20 denotes an $i_\gamma^*$ update unit which sequentially updates $i_\gamma^*$ to be supplied to the specified voltage calculation unit 15 at a predetermined update period. The $i_\gamma^*$ update unit 20 is disposed in a specified current calculation unit 14 illustrated in FIG. 3. The $i_\gamma^*$ update unit 20 includes the individual units denoted by numerals 21 to 25. In addition, a block diagram of a part of the $i_\gamma^*$ update unit 20 is illustrated in FIG. 6.

The disturbance magnetic flux estimation unit 21 estimates the disturbance magnetic flux $\phi_{dis}$ in accordance with the above equation (2a), (2b) or (2c) on the basis of $v_\gamma^*, v_\delta^*, V_{om}$ and $\omega_e$ or $\omega^*$. In this case, $\omega_e$ or $\omega^*$ is used as ω in the equations (2a), (2b) and (2c). If the equations (2a), (2b) and (2c) are used, $\phi_{dis1}, \phi_{dis2}$ and $\phi_{dis3}$ are estimated respectively as the disturbance magnetic flux $\phi_{dis}$. The limit voltage value $V_{om}$ is an upper limit value in the amplitude range that is allowed in the motor voltage $V_a$ and is determined in accordance with a power supply voltage value of the inverter 2. As understood also from the equation (2a), (2b) and (2c), the disturbance magnetic flux $\phi_{dis}$ is estimated from difference information indicating a difference between the specified voltage signal ($v_\gamma^*$, $v_\delta^*$) and the limit voltage value $V_{om}$ and the rotation speed information ($\omega_e$ or $\omega^*$). This difference information corresponds to $\omega\phi_{dis1}$, $\omega\phi_{dis2}$ or $\omega\phi_{dis3}$ in the above equation (1a), (1b) or (1c). A multiplier unit 22 multiplies a predetermined gain $K_{dis}$ to the disturbance magnetic flux $\phi_{dis}$ and outputs the result value $K_{dis}\cdot\phi_{dis}$.

Figure 7:
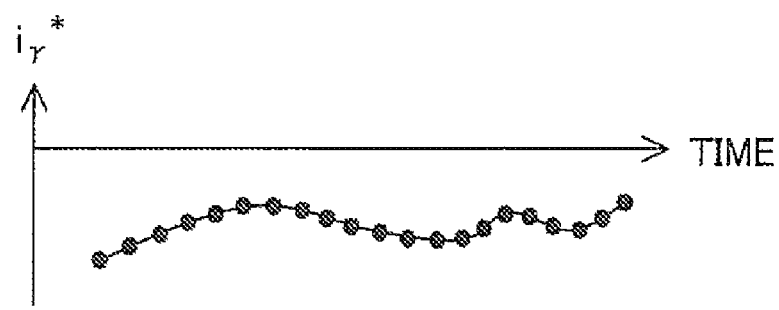
FIG. 7 is a diagram illustrating a signal waveform of a specified γ-axis current signal having the specified γ-axis current value ($i_\gamma$*) as a signal value.

A low pass filter (hereinafter referred to as a LPF) 23 is sequentially supplied with the latest $i_\gamma^*$ that is the same as that supplied to the specified voltage calculation unit 15. FIG. 7 illustrates a signal waveform of the specified γ-axis current signal having $i_\gamma^*$ as the signal value. The dots in FIG. 7 indicate plotted values of $i_\gamma^*$ at individual time points. In particular, $i_\gamma^*$ changes every moment in a transient response, and therefore, the specified γ-axis current signal has various frequency components. The LPF 23 reduces predetermined high frequency components contained in the specified γ-axis current signal that is an input signal thereof and outputs the specified γ-axis current signal after the reduction. A transfer function H between input and output signals in the LPF 23 is expressed by the equation (3). In the transfer function H, "s" denotes the Laplace operator, and "T" denotes a predetermined time constant. An output signal value of the LPF 23, i.e., a value of the specified γ-axis current signal after the high frequency components are reduced by the LPF 23 is denoted by $i_{\gamma 1}^*$ for convenience sake.

$$H = \frac{1}{1+sT} \quad (3)$$

Figure 8:
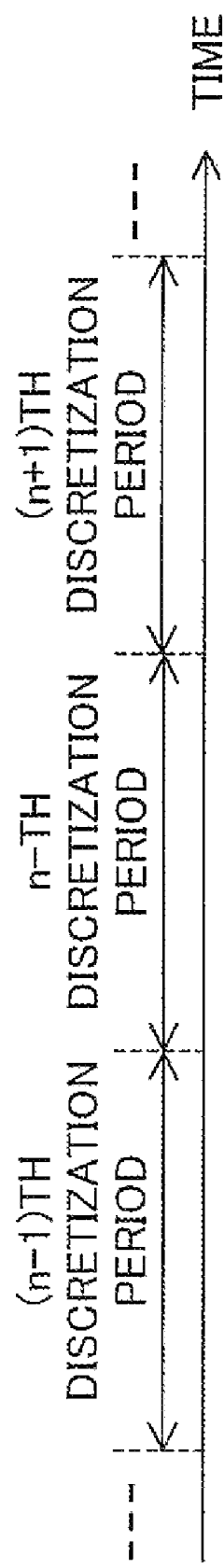
FIG. 8 is a diagram illustrating a temporal relationship among discretization periods coming sequentially.

An adder unit 24 adds the output signal value $K_{dis}\cdot\phi_{dis}$ of the multiplier unit 22 to the output signal value $i_{\gamma 1}^*$ of the LPF 23 and outputs the result value ($i_{\gamma 1}^* + K_{dis}\cdot\phi_{dis}$) as a candidate value $i_{\gamma 2}^*$. The candidate value $i_{\gamma 2}^*$ is also updated sequentially at a predetermined update period similarly to $i_\gamma^*$, $i_{\gamma 1}^*$, $\phi_{dis}$ and the like. The period coming every time when the update period passes is referred to as a discretization period. As illustrated in FIG. 8, the (n+1)th discretization period is a discretization period that comes next to the n-th discretization period (n is a natural number). A length of each discretization period is the same as a length of the update period. The candidate value $i_{\gamma 2}^*$ in the n-th discretization period based on $i_{\gamma 1}^*$ and $\phi_{dis}$ in the n-th discretization period is handled as a candidate of $i_\gamma^*$ in the (n+1)th discretization period. Therefore, a signal having the candidate value $i_{\gamma 2}^*$ as the signal value can be referred to as a candidate signal that is a candidate of the specified γ-axis current signal.

Here, for convenience sake, $i_\gamma^*$ in the n-th discretization period is particularly expressed by $i_\gamma^*[n]$. The same is true for $i_{\gamma 1}^*$, $\phi_{dis}$ and the like (the same is true in other embodiments described later). Then, the following expression holds. The candidate value $i_{\gamma 2}^*[n]$ based on $i_{\gamma 1}^*[n]$ and $\phi_{dis}[n]$ is handled as a candidate of $i_\gamma^*[n+1]$.

The limit unit 25 limits the candidate value $i_{\gamma 2}^*$ by a limit value $i_{\gamma L}^*$ so as to determine $i_\gamma^*$ to be supplied to the specified voltage calculation unit 15 and the LPF 23 next time. More specifically, the limit value $i_{\gamma L}^*[n]$ and the candidate value $i_{\gamma 2}^{**}[n]$ are compared with each other. If the inequality "$i_{\gamma L}^*[n] \geq i_{\gamma 2}^*[n]$" holds, the candidate value $i_{\gamma 2}^*[n]$ is output as $i_\gamma^*[n+1]$. On the contrary, if the inequality "$i_{\gamma L}^*[n] < i_{\gamma 2}^*[n]$" holds, the limit value $i_{\gamma L}^*[n]$ is output as the $i_\gamma^*[n+1]$. Thus, the specified γ-axis current value $i_\gamma^*$ is always limited to be the limit value $i_{\gamma L}^*$ or lower.

The value of the γ-axis current $i_\gamma$ to be supplied to the motor 1 when the motor 1 is driven by maximum torque control is substituted into the limit value $i_{\gamma L}^*$. Therefore, when γδ axes follows the dq axes, the limit value $i_{\gamma L}^*$ is derived from the following equation (4). As known well, $i_{\gamma L}^*$ that satisfies the equation (4) has a negative value. Since the limit value $i_{\gamma L}^*$ that satisfies the equation (4) depends on $i_\delta^*$, $i_{\gamma L}^*[n]$ and $i_{\gamma L}^*[n+1]$ may be different from each other.

$$i_{\gamma L}^* = \frac{\Phi_a}{2(L_q - L_d)} - \sqrt{\frac{\Phi_a^2}{4(L_q - L_d)^2} + i_\delta^2} \quad (4)$$

According to the above-mentioned configuration, the value ($K_{dis}\cdot\phi_{dis}$) corresponding to the disturbance magnetic flux $\phi_{dis}$ is added to the signal obtained when the specified γ-axis current signal $i_\gamma^*$ passes through the LPF 23 so that the specified γ-axis current signal is corrected. When the rotation speed of the motor 1 increases, $\sqrt{(v_\gamma^{*2}+v_\delta^{*2})}$ is basically increased. The value $\sqrt{(v_\gamma^{*2}+v_\delta^{*2})}$ represents a magnitude of the specified voltage value (in other word, a magnitude of the specified voltage signal which includes the values $v_\gamma^*$ and $v_\delta^*$ as signal components). If the value $\sqrt{(v_\gamma^{*2}+v_\delta^{*2})}$ reaches $V_{om}$ due to high rotation speed of the motor 1, the flux-weakening control is necessary. In the state where the flux-weakening control is necessary, the negative $i_{\gamma 2}^*$ having relatively large absolute value is generated so that the inequality "$i_{\gamma L}^* \geq i_{\gamma 2}^*$" is satisfied. As a result, the limit unit 25 does not function. Therefore, when the flux-weakening control is performed, the candidate signal $i_{\gamma 2}^*$ obtained by correction based on the disturbance magnetic flux $\phi_{dis}$ becomes the specified γ-axis current signal as it is. The correction is performed until the estimated disturbance magnetic flux $\phi_{dis}$ becomes zero. In addition, since the LPF 23 is used, chattering (a phenomenon in which actual $i_\gamma^*$ varies upward and downward from ideal $i_\gamma^*$) due to the correction is suppressed.

Switching between the flux-weakening control and the maximum torque control is performed smoothly by the limiting process in the limit unit 25.

For instance, if the rotation speed of the motor 1 is decreased from the state where the specified voltage signal ($v_\gamma^*$, $v_\delta^*$) is relatively large and the flux-weakening control is necessary, so that $\sqrt{(v_\gamma^{*2}+v_\delta^{*2})}$ becomes lower than $V_{om}$, the inequality "$i_{\gamma L}^* < i_{\gamma 2}^*$" holds. In this case, the limit value $i_{\gamma L}^*$ is supplied as the specified γ-axis current value $i_\gamma^*$ to the specified voltage calculation unit 15 by the limiting process. Therefore, the maximum torque control is realized. In other words, the vector control performed on the motor 1 is switched smoothly from the flux-weakening control to the maximum torque control.

On the contrary, if the rotation speed of the motor 1 increases from the state where the maximum torque control is performed so that $\sqrt{(v_\gamma^{*2}+v_\delta^{*2})}$ reaches $V_{om}$, the inequality "$i_{\gamma L}^* \geq i_{\gamma 2}^*$" is satisfied and the limit unit 25 does not function as described above. As a result, the vector control performed on the motor 1 is changed smoothly from the maximum torque control to the flux-weakening control.

Note that the disturbance magnetic flux estimation unit 21, the multiplier unit 22 and the adder unit 24 generate the candidate value $i_{\gamma 2}^*$ so that the equation "$\sqrt{(v_\gamma^{*2}+v_\delta^{*2})}=V_{on}$" is satisfied provided that the candidate value $i_{\gamma 2}^*$ is selected as $i_\gamma^*$. However, when the maximum torque control is performed, not $i_{\gamma2}^*$ but the limit value $i_{\gamma L}^*$ is supplied as the specified γ-axis current value $i_\gamma^*$ to the specified voltage calculation unit 15. Therefore, "$\sqrt{(v_\gamma^{*2}+v_\delta^{*2})}<V_{om}$" holds.

According to the above-mentioned configuration, the γ-axis current is controlled by using disturbance magnetic flux information based on the difference information between the magnitude of the specified voltage value (in other word, the magnitude of the specified voltage signal) and the limit voltage value so that the difference between the magnitude of the specified voltage value (in other word, the magnitude of the specified voltage signal) and the limit voltage value becomes zero. Therefore, a desired flux-weakening control can be realized without being affected by the change or the like of the motor parameter. Even if the control axes (γδ axes) and the dq axes are shifter from each other, amplitude of the motor voltage $V_a$ can be limited correctly by the limit voltage value. Further, since the specified γ-axis current value $i_\gamma^*$ is generated without using the PI controller, the anti-windup measure becomes unnecessary, the switching between the maximum torque control and the flux-weakening control can be realized easily and smoothly (only by limiting so that $i_\gamma^*$ does not exceed $i_\gamma^*$ on a basis of using $i_{\gamma2}^*$ as $i_\gamma^*$).

Here, the correction of the γ-axis current by using the disturbance magnetic flux information will be described additionally. As known well, in a motor, the magnetic flux is proportional to the current but is not proportional to the rotation speed. However, the voltage is proportional to the magnetic flux and the rotation speed. Therefore, disturbance magnetic flux information ($\phi_{dis}$) that does not depend on the rotation speed can be generated by dividing the voltage information (difference information between the magnitude of the specified voltage value and the limit voltage value) by the rotation speed. In this embodiment, the disturbance magnetic flux information is used as information that is proportional to the current and is utilized for correction of the γ-axis current. The correction of the γ-axis current by using the product of the disturbance magnetic flux information ($\phi_{dis}$) and an appropriate coefficient ($K_{dis}$) is equivalent to correction of the γ-axis current by using the product of the disturbance current information (error current information) and an appropriate coefficient.

[Reference: Configuration Example when the PI Controller is Used]

Figure 24:
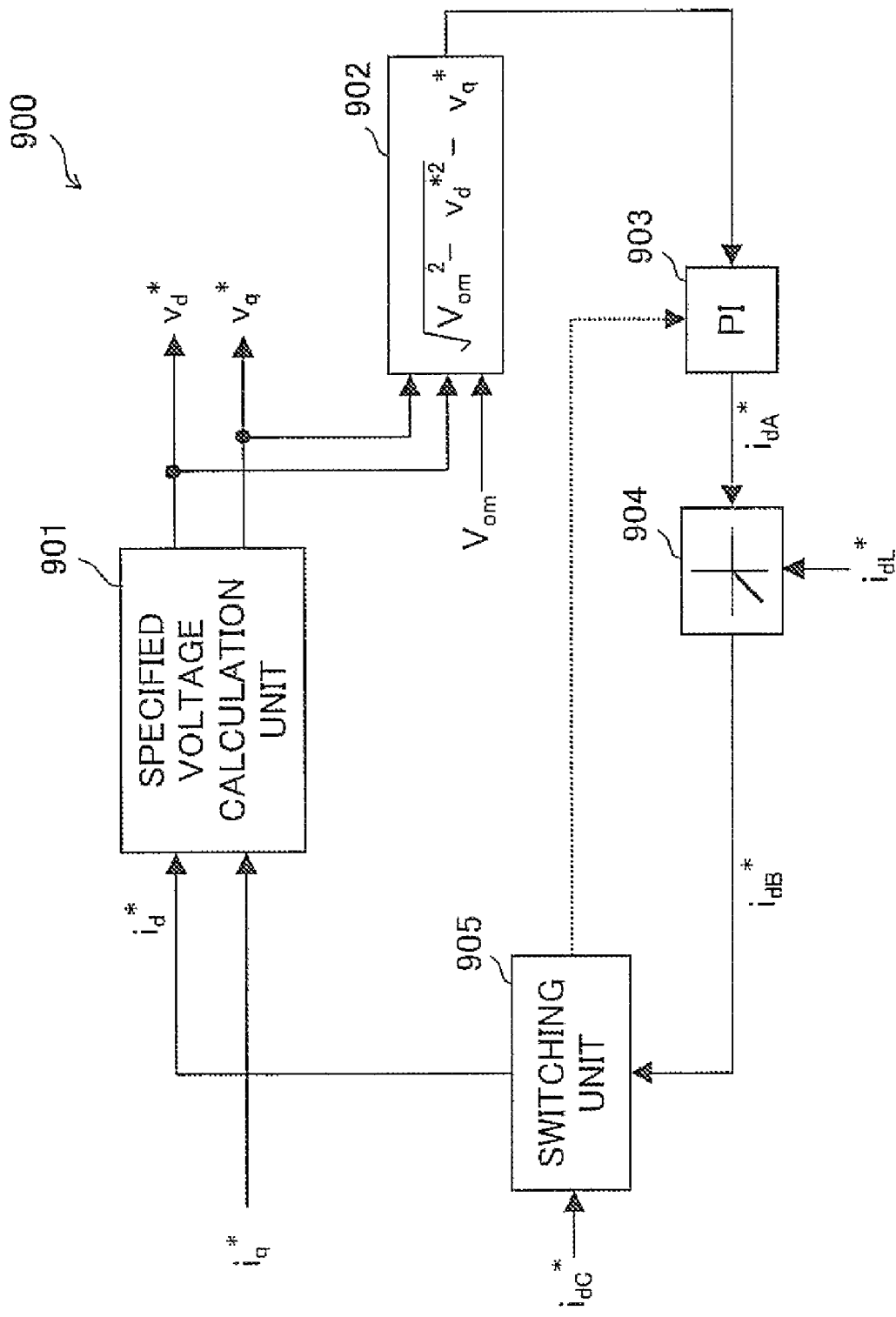
FIG. 24 is a block diagram of a device which generates a specified d-axis current value ($i_d^*$) using PI control.

In addition, as a reference, a block diagram of a device 900 which controls so that ($\sqrt{(V_{om}^2-v_d^{*2})}-v_q^*$) becomes zero by using the PI controller is illustrated in FIG. 24. The values $v_d^*$ and $v_q^*$ are the specified d-axis voltage value and the specified q-axis voltage value to be targets of the d-axis voltage and the q-axis voltage. The values $i_d^*$ and $i_q^*$ are the specified d-axis current value and the specified q-axis current value to be targets of the d-axis current and the q-axis current.

A calculation unit 902 calculates ($\sqrt{(V_{om}^2-v_d^{*2})}-v_q^*$) from $v_d^*$ and $v_q^*$ calculated by a specified voltage calculation unit 901 on the basis of $i_d^*$ and $i_q^*$ and the limit voltage value $V_{om}$. A PI controller 903 generates a temporary specified value $i_{dA}^*$ by the PI control so that $\sqrt{(V_{om}^2-v_d^{*2})}-v_q^*$ becomes zero. If the specified value $i_{dA}^*$ is supplied to the specified voltage calculation unit 901 as it is as $i_d^*$, $\sqrt{(V_{om}^2-v_d^{*2})}-v_q^*$ is controlled to be zero. In the actual system, $i_d^*$ is required not to exceed a predetermined limit value $i_{dL}^*$. Therefore, a limit unit 904 outputs $i_{dA}^*$ as $i_{dB}^*$ if the inequality "$i_{dL}^* \geq i_{dA}^*$" holds, while it outputs $i_{dL}^*$ as $i_{dB}^*$ if the inequality "$i_{dL}^* < i_{dA}^*$" holds. The limit value $i_{dL}^*$ is a limit value for realizing the flux-weakening control. A switching unit 905 is supplied with an output value $i_{dB}^*$ of the limit unit 904 and a value $i_{dC}^*$ that is identical to the d-axis current value for realizing the maximum torque control. The switching unit 905 selects $i_{dB}^*$ as $i_d^*$ when the flux-weakening control is performed, while it selects $i_{dC}^*$ as $i_d^*$ when the maximum torque control is performed, so as to realize switching between the flux-weakening control and the maximum torque control.

It is known that if the output of the PI controller is limited by the limit value, the integrator of the PI controller performs excessive integration that causes the windup phenomenon. As a method of suppressing the windup phenomenon, there is a method of stopping the integration or a method of providing an integrator with limit. However, it becomes necessary to perform the decision process of the condition for restarting the integration or other process, so that the process algorithm becomes complicated.

The same is true for the case where the vector control to be executed is switched between the flux-weakening control and the maximum torque control. In order to avoid the excessive integration by the integrator in the switching process, it is necessary to stop the integration by the integrator in the period while the PI controller is not effective (the period while $i_{dC}^*$ is selected as $i_d^*$ in FIG. 24). In addition, if the PI control is restarted without considering the integrated value of the integrator, the switching cannot be performed smoothly. Therefore, in the configuration as illustrated in FIG. 24, the integrated value of the integrator is considered when it is decided whether the condition for restarting the PI control is satisfied or unsatisfied. Otherwise, it is necessary to perform update or reset of the integrated value of the integrator or other process so that the output of the PI controller does not become discontinuous, but such a process makes the process algorithm complicated.

Figure 25:
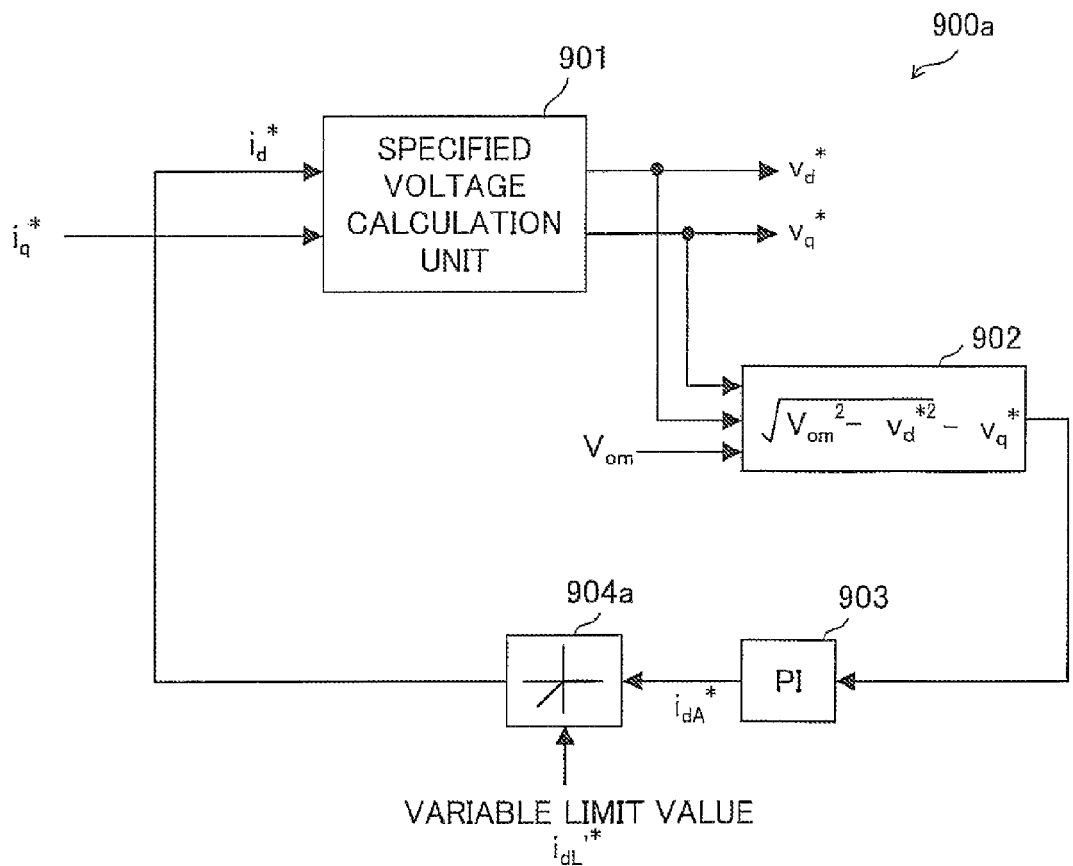
FIG. 25 is a block diagram of a variation of the device which generates the specified d-axis current value ($i_d^*$) using PI control.

Note that it is also possible to modify the configuration of the device 900 illustrated in FIG. 24 into the configuration as illustrated in FIG. 25. A device 900a illustrated in FIG. 25 is equipped with the specified voltage calculation unit 901, the calculation unit 902 the PI controller 903, and a limit unit 904a. The limit unit 904a is supplied with a variable limit value $i_{dL}'^*$ and an output value $i_{dA}^*$ of the PI controller 903. The limit unit 904a outputs $i_{dA}^*$ as $i_d^*$ if the inequality "$i_{dL}'^* \geq i_{dA}^*$" holds, while it outputs $i_{dL}'^*$ as $i_d^*$ if the inequality "$i_{dL}'^* < i_{dA}^*$" holds. The limit value for realizing the flux-weakening control is substituted into the variable limit value $i_{dL}'^*$ when the flux-weakening control is performed, while the limit value for realizing the maximum torque control is substituted into the same when the maximum torque control is performed. The device 900a can obtain $i_d^*$ that is the same as $i_d^*$ that is generated in the device 900. Therefore, it can be said that the device 900 and the device 900a are equivalent to each other. The limiting process by the limit unit usually uses a constant limit value for limitation, but the limit value may be variable like the configuration illustrated in FIG. 25 and may be determined by an operational equation or a table, so that the same effect can be obtained as the case where the switching unit 905 is provided.

[Variation Example of LPF Location]

Figure 9:
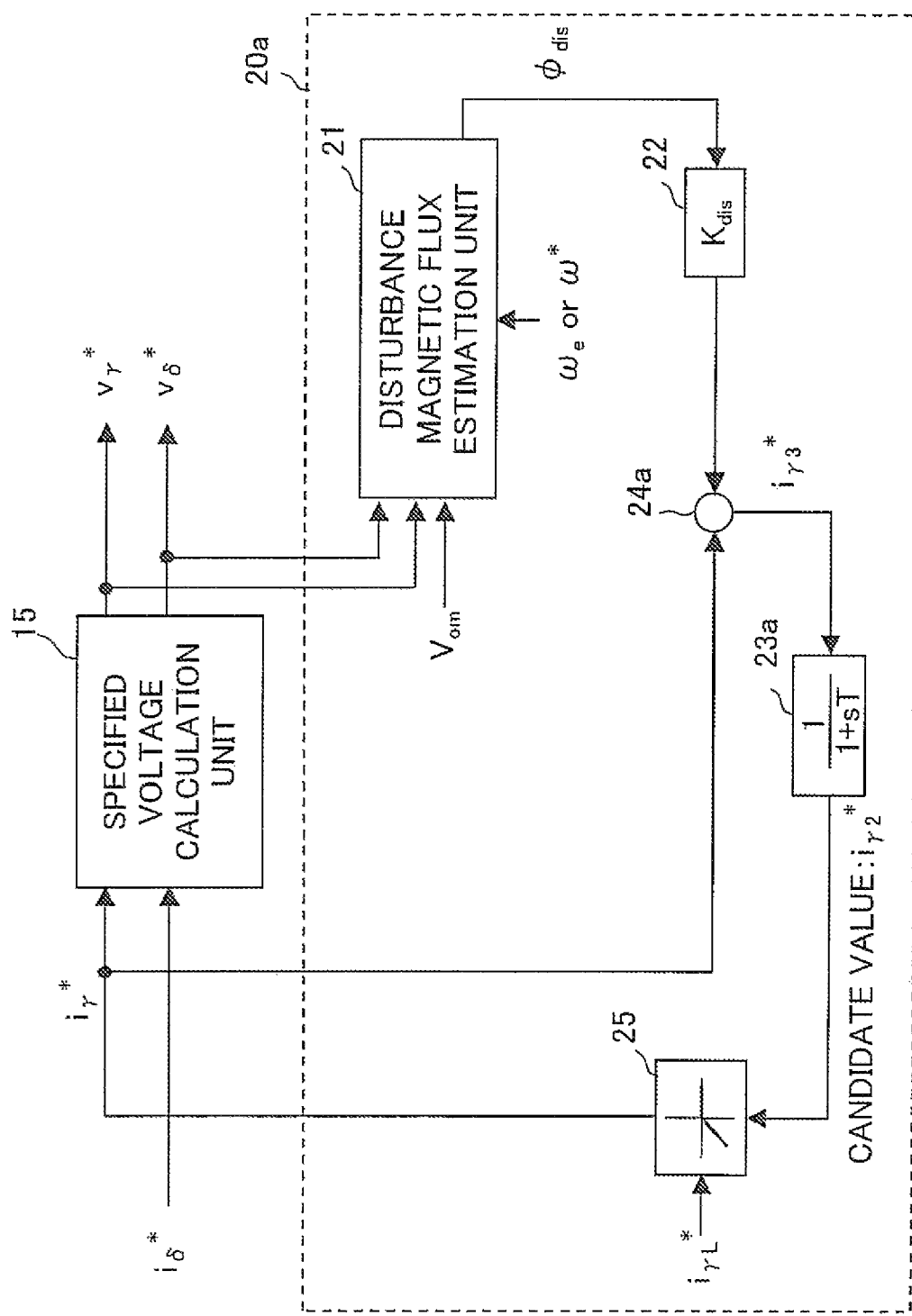
FIG. 9 is a block diagram of a variation of a part that is particularly related to generation of the specified γ-axis current value ($i_\gamma$*) according to the first embodiment of the present invention.
Figure 10:
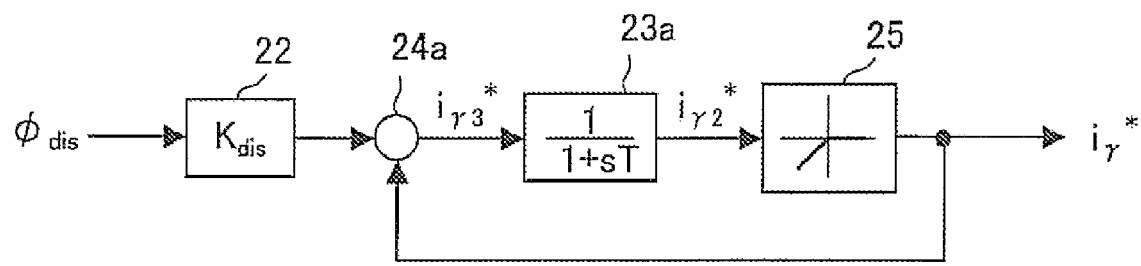
FIG. 10 is a block diagram of a part of the $i_\gamma^*$ update unit illustrated in FIG. 9.

In the $i_\gamma^*$ update unit 20 illustrated in FIG. 5, the low pass filter process is performed before the correction by the disturbance magnetic flux information. However, the low pass filter process may be performed after the correction by the disturbance magnetic flux information. In other words, instead of the $i_\gamma^*$ update unit 20 illustrated in FIG. 5, an $i_\gamma^*$ update unit 20a illustrated in FIG. 9 may be disposed in the specified current calculation unit 14 illustrated in FIG. 3, so that $i_\gamma^*$ is generated by using the $i_\gamma^*$ update unit 20a. FIG. 10 is a block diagram of a part of the $i_\gamma^*$ update unit 20a.

The $i_\gamma^*$ update unit 20a includes individual units denoted by numerals 21, 22, 23a, 24a and 25. In the $i_\gamma^*$ update unit 20a, the disturbance magnetic flux estimation unit 21 and the multiplier unit 22 calculate the value $K_{dis}\cdot\phi_{dis}$ in accordance with the above-mentioned method. The adder unit 24a adds the output value ($K_{dis}\cdot\phi_{dis}$) of the multiplier unit 22 to the value $i_\gamma^*$ that is the same as the input to the specified voltage calculation unit 15, and outputs the result value ($i_\gamma^*+K_{dis}\cdot\phi_{dis}$) to the LPF 23a. For convenience sake, it is supposed that ($i_\gamma^*+K_{dis}\cdot\phi_{dis}$)=$i_{\gamma3}^*$ holds, and the signal having the value $i_{\gamma3}^*$ as the signal value is referred to as an intermediate signal.

The LPF 23a reduces predetermined high frequency components included in the intermediate signal $i_{\gamma3}^*$ that is an input signal of itself and outputs the signal after the reduction as the candidate signal $i_{\gamma2}^*$. The transfer function between input and output signals of the LPF 23a is the same as that of the LPF 23. The signal value of the candidate signal $i_{\gamma2}^*$ (i.e., the candidate value $i_{\gamma2}^*$) is sent to the limit unit 25. The function of the limit unit 25 is the same between the $i_\gamma^*$ update units 20 and 20a. In other words, $i_{\gamma3}^*[n]$ is calculated from $i_\gamma^*[n]$ and $\phi_{dis}[n]$, high frequency components of the intermediate signal $i_{\gamma3}^*$ including $i_{\gamma3}^*[n]$ are reduced so that $i_{\gamma2}^*[n]$ is obtained (not only $i_{\gamma3}^*[n]$ but also $i_{\gamma3}^*[n-1]$ and the like is naturally concerned with generation of $i_{\gamma2}^*[n]$). The limit unit 25 outputs the candidate value $i_{\gamma2}^*[n]$ as $i_\gamma^*[n+1]$ if the inequality $i_{\gamma L}^*[n]\geq i_{\gamma2}^*[n]$ holds, while it outputs the limit value $i_{\gamma L}^*[n]$ as $i_\gamma^*[n+1]$ if the inequality $i_{\gamma L}^*[n]<i_{\gamma2}^*[n]$ holds.

When the n-th discretization period is considered as a reference, $i_\gamma^*[n+1]$ corresponds to the specified γ-axis current signal after the update, and the specified γ-axis current signal before the update corresponds to the specified γ-axis current signal before $i_\gamma^*[n+1]$ (i.e., $i_\gamma^*[n]$ or $i_\gamma^*[n-i]$ to $i_\gamma^*[n]$) (i is a natural number).

The $i_\gamma^*$ update unit 20 illustrated in FIG. 5 corrects the signal obtained when the specified γ-axis current signal before the update passes through the LPF 23, by using the difference information between the magnitude of the specified voltage value (in other word, a magnitude of the specified voltage signal which includes the values $v_\gamma^*$ and $v_\delta^*$ as signal components) and the limit voltage value (more specifically, by using the estimated disturbance magnetic flux $\phi_{dis}$), so as to generate the candidate signal $i_{\gamma2}^*$. On the other hand, the $i_\gamma^*$ update unit 20a illustrated in FIG. 9 corrects the specified γ-axis current signal before the update by using above-mentioned difference information (more specifically, by using the estimated disturbance magnetic flux $\phi_{dis}$), and the corrected signal passes through the LPF 23a, so that the candidate signal $i_{\gamma2}^*$ is generated. In the $i_\gamma^*$ update unit 20 or 20a, the limit unit 25 limits the signal value of the candidate signal (i.e., the candidate value $i_{\gamma2}^*$) by the limit value $i_{\gamma L}^*$ so as to generate the specified γ-axis current signal after the update.

In the $i_\gamma^*$ update unit 20, the part including the disturbance magnetic flux estimation unit 21, the multiplier unit 22, the LPF 23 and the adder unit 24 functions as a candidate signal generation unit. In contrast, in the $i_\gamma^*$ update unit 20a, the part including the disturbance magnetic flux estimation unit 21, the multiplier unit 22, the LPF 23a and the adder unit 24a functions as the candidate signal generation unit.

[About Limit Voltage Value $V_{om}$]

In the $i_\gamma^*$ update unit 20 or 20a, $i_{\gamma2}^*$ and $i_\gamma^*$ are generated so that the applied voltage to the motor 1 following the specified voltage signal ($v_\gamma^*$, $v_\delta^*$) does not exceed the limit voltage value $V_{om}$ (i.e., the amplitude $|V_a|$ of the motor voltage $V_a$ does not exceed the limit voltage value $V_{om}$). However, in the acceleration period of the rotation speed of the motor 1, the amplitude $|V_a|$ may exceed the limit voltage value $V_{om}$ in a transient manner. Considering this, the $i_\gamma^*$ update unit 20 or 20a changes the limit voltage value $V_{om}$ in accordance with a change state of the rotation speed of the motor 1 (however, it is possible that $V_{om}$ is always constant). Here, the rotation speed is defined by the specified rotation speed value ω*, but it may be $ω_e$.

Figure 11:
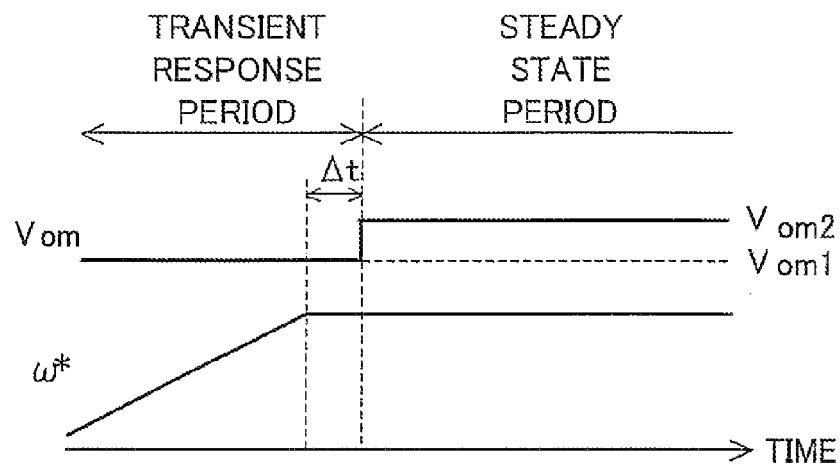
FIG. 11 is a diagram illustrating a manner in which a limit voltage value ($V_{om}$) is changed in accordance with rotation speed information ($\omega_c$) according to the first embodiment of the present invention.

For instance, it is preferable to use a relatively small voltage value $V_{om1}$ as the limit voltage value $V_{om}$ in a transient response period and to use a relatively large voltage value $V_{om2}$ as the limit voltage value $V_{om}$ in a steady state period. Here, $V_{om1}<V_{om2}$ holds. As illustrated in FIG. 11, the transient response period includes not only the period where the rotation speed (ω* or $ω_e$) is changing but also the period until a predetermined time Δt passes after the time point of change from the state where the rotation speed (ω* or $ω_e$) is changing to the state where the rotation speed (ω* or $ω_e$) is maintained to be constant. The period other than the transient response period is the steady state period, and the rotation speed (ω* or $ω_e$) is maintained to be a constant speed in the steady state period. The time Δt is time necessary for actual rotation speed to settle to a constant rotation speed. Note that it is possible to use the voltage value $V_{om2}$ as the limit voltage value $V_{om}$ in the period while the rotation speed (ω* or $ω_e$) is decreasing as well as the period until a predetermined time Δt passes after the time point of change from the state where the rotation speed (ω* or $ω_e$) is decreasing to the state where the rotation speed (ω* or $ω_e$) is maintained to be constant, although it is the transient response period.

Figure 12:
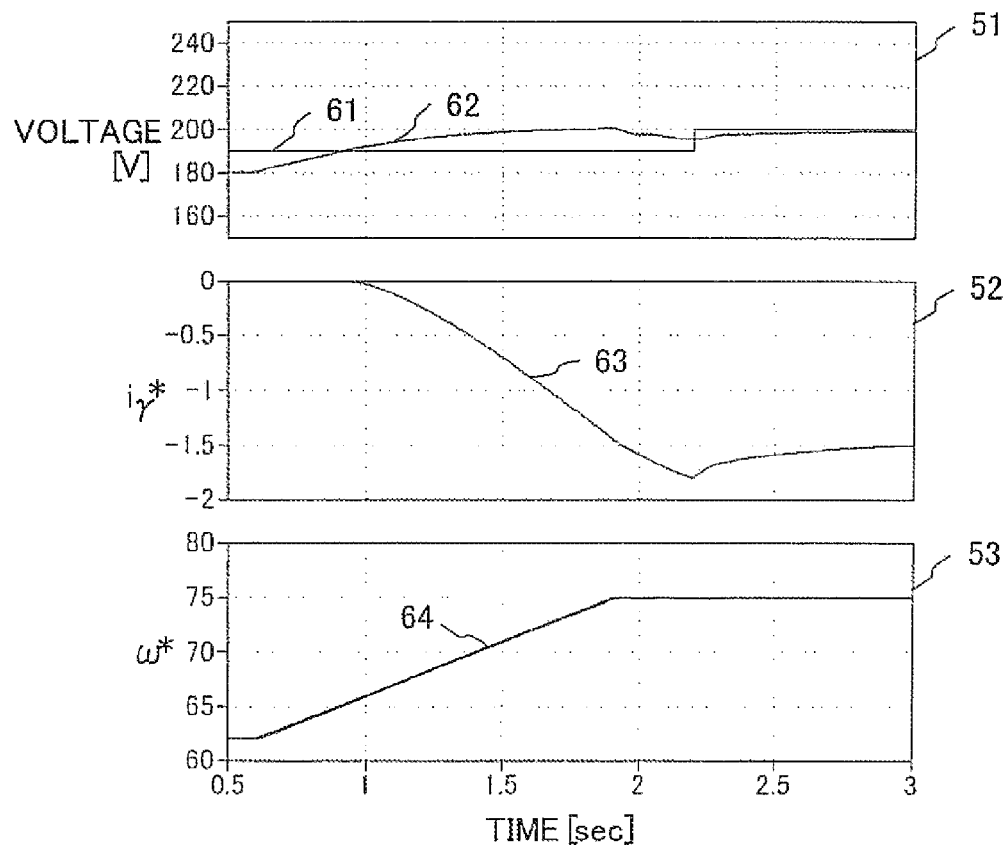
FIG. 12 is a diagram illustrating a relationship among the limit voltage value, a motor voltage amplitude, the specified γ-axis current value ($i_\gamma^*$) and a specified rotation speed value ($\omega^*$) when the specified rotation speed value ($\omega^*$) is increased according to the first embodiment of the present invention.

Waveforms of $V_{om}$, $|V_a|$ and $i_\gamma^*$ that are observed when ω* is increased as illustrated in a graph 53 of FIG. 12 are illustrated in graphs 51 and 52 of FIG. 12. In the graphs 51 to 53, a broken line 61 indicates a manner in which the limit voltage value $V_{om}$ changes, a curve 62 indicates a manner in which the amplitude $|V_a|$ of the motor voltage $V_a$ changes, a curve 63 indicates a manner in which $i_\gamma^*$ changes, and a broken line 64 indicates a manner in which ω* changes. As illustrated also in FIG. 12, the amplitude $|V_a|$ may temporarily exceed the limit voltage value $V_{om}$ in the transient response period. Therefore, it is not preferable that the limit voltage value $V_{om}$ is set to a value (corresponding to $V_{om2}$) that is very close to a tolerance limit in the transient response period. Therefore, the limit voltage value $V_{om}$ is set to a value (corresponding to $V_{om1}$) having a margin for the value that is very close in the transient response period. Thus, the amplitude $|V_a|$ can be securely controlled to be within the tolerance limit even in the transient response period.

It is preferable to set at least the voltage value $V_{om2}$ out of the voltage values $V_{om1}$ and $V_{om2}$ to be a voltage value in an overmodulation region. It is also possible to set also the voltage value $V_{om1}$ to a voltage value in the overmodulation region. The voltage value in the overmodulation region means a value of the voltage to be applied to the motor 1 when the inverter 2 performs the overmodulation (more specifically, a value of the amplitude $|V_a|$ of the motor voltage $V_a$ when the inverter 2 performs the overmodulation).

The inverter 2 can drive the motor 1 by using sine wave PWM control. In the sine wave PWM control, the DC voltage supplied to the inverter 2 is converted into the three-phase AC voltage including three sine wave AC voltages by the PWM, and the individual sine wave AC voltages are supplied to the individual phases of the motor 1. However, if it is desired to supply the motor 1 with a voltage higher than the maximum voltage that can be output by the sine wave PWM control, the inverter 2 can use rectangular wave drive instead of the sine wave PWM control. In the rectangular wave drive, voltages having a voltage waveform similar to a rectangular wave are applied to the individual phases of the motor 1. The modulation method or the PWM for realizing the rectangular wave drive is usually referred to as overmodulation or overmodulation PWM. When the inverter 2 performs the overmodulation, the amplitude of the motor voltage $V_a$ (i.e., a value of $|V_a|$) exceeds "$1/(\sqrt{2}) \times V_{dc}$". The symbol $V_{dc}$ denotes a value of the above-mentioned DC voltage that is supplied to the inverter 2.

Note that in the configuration of FIG. 3, current values of the U-phase current $i_u$ and the V-phase current $i_v$ flowing between the inverter 2 and the motor 3 are directly detected by using the phase current sensor 11 disposed between the inverter 2 and motor 3. Therefore, the current values $i_u$ and $i_v$ and the current values $i_\gamma$ and $i_\delta$ based on the same in the configuration of FIG. 3 can be said to be detection values of the supplied currents to the motor 1. However, it is possible to detect the current values $i_u$ and $i_v$ via the estimation process. For instance, it is possible to detect current flowing between the DC power supply (not shown) for supplying the above-mentioned DC voltage to the inverter 2 and the inverter 2 by using a current sensor 11a (not shown) disposed between the DC power supply and the inverter 2 and to estimate current values $i_u$ and $i_v$ on the basis of a value of the detected current between DC power supply and the inverter 2. The current values $i_u$ and $i_v$ derived via the estimation and the current values $i_\gamma$ and $i_\delta$ based on the same can be said to be estimated values of the current supplied to the motor 1 (however, it is also possible to interpret that current values $i_u$, $i_v$, $i_\gamma$ and $i_\delta$ based on the detection result of the current sensor 11a are also detection values of the currents supplied to the motor 1 because there is no difference in using the current sensor). The method of estimating the current values $i_u$, $i_v$, $i_\gamma$ and $i_\delta$ by using the current sensor 11a can be applied to other embodiments described later.

Second Embodiment

A second embodiment according to the present invention will be described. The second embodiment and other embodiments described later are embodiments based on the first embodiment. The description in the first embodiment can be applied to the second embodiment and other embodiments described later as long as no contradiction arises. Note that in this application, a difference between numerals or symbols assigned to the units of the same name (e.g., a difference between numerals $3_A$ and $3_B$ assigned to the "motor control devices", see FIGS. 3 and 13) is ignored appropriately.

The method of the first embodiment described above in which the PI controller is not used can also be applied to generation of a specified value or the like other than $i_\gamma^*$. In the second embodiment, this method is used for generating the specified voltage signal ($v_\gamma^*$, $v_\delta^*$).

Figure 13:
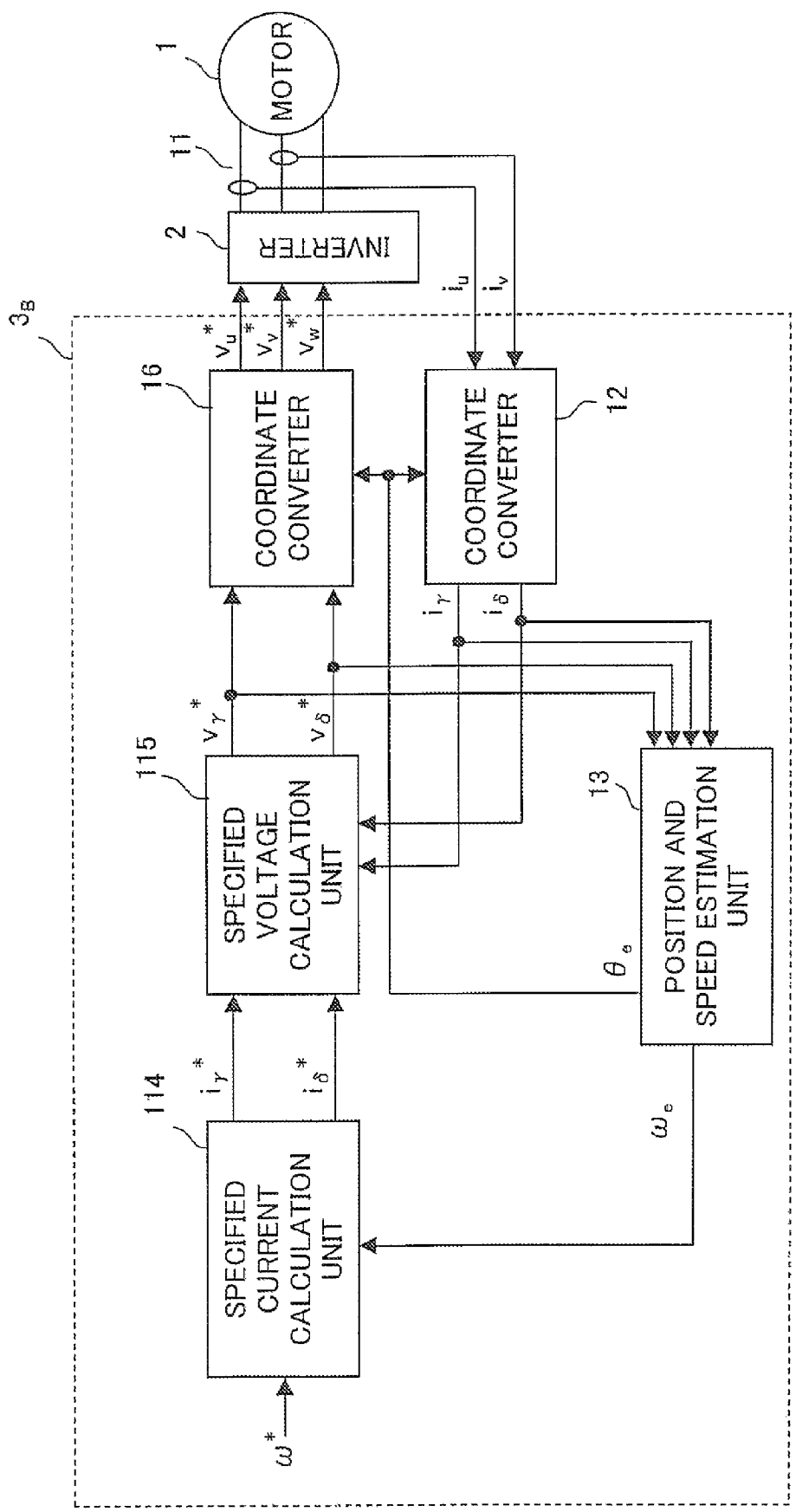
FIG. 13 is a detail block diagram of a motor drive system according to a second embodiment of the present invention.

FIG. 13 is a detail block diagram of a motor drive system according to the second embodiment. The motor drive system illustrated in FIG. 13 includes the motor 1 and the inverter 2 illustrated in FIG. 1, a motor control device $3_B$ that functions as the motor control device 3 illustrated in FIG. 1, and the phase current sensor 11. The motor control device $3_B$ includes the individual units denoted by numerals 12, 13, 114, 115 and 16. The coordinate converters 12 and 16 and the position and speed estimation unit 13 in the motor control device $3_B$ illustrated in FIG. 13 are the same as those according to the first embodiment (see FIG. 3). In the second embodiment too, it is supposed that the rotor position $\theta_e$ and the rotation speed $\omega_e$ are estimated so that the axial error $\Delta\theta$ becomes zero similarly to the first embodiment.

The specified current calculation unit 114 calculates the speed deviation ($\omega^* - \omega_e$) and calculates the specified $\delta$-axis current value $i_\delta^*$ by using the PI control or the like so that the speed deviation ($\omega^* - \omega_e$) converges to zero, so as to output the result. Further, the specified current calculation unit 114 uses $i_\delta^*$ or the like if necessary, so as to calculate the specified $\gamma$-axis current value $i_\gamma^*$ for realizing desired vector control (maximum torque control or flux-weakening control). The specified current calculation unit 114 may be the same as the specified current calculation unit 14 illustrated in FIG. 3.

The specified voltage calculation unit 115 calculates the specified $\gamma$-axis voltage value $v_\gamma^*$ and the specified $\delta$-axis voltage value $v_\delta^*$ so that both current errors ($i_\gamma^* - i_\gamma$) and ($i_\delta^* - i_\delta$) based on $i_\gamma^*$, $i_\delta^*$, $i_\gamma$ and $i_\delta$ from the specified current calculation unit 114 and the coordinate converter 12 converge to zero. The PI control is usually used for this calculation, but the specified voltage calculation unit 115 calculates $v_\gamma^*$ and $v_\delta^*$ without using the PI control.

Figure 14:
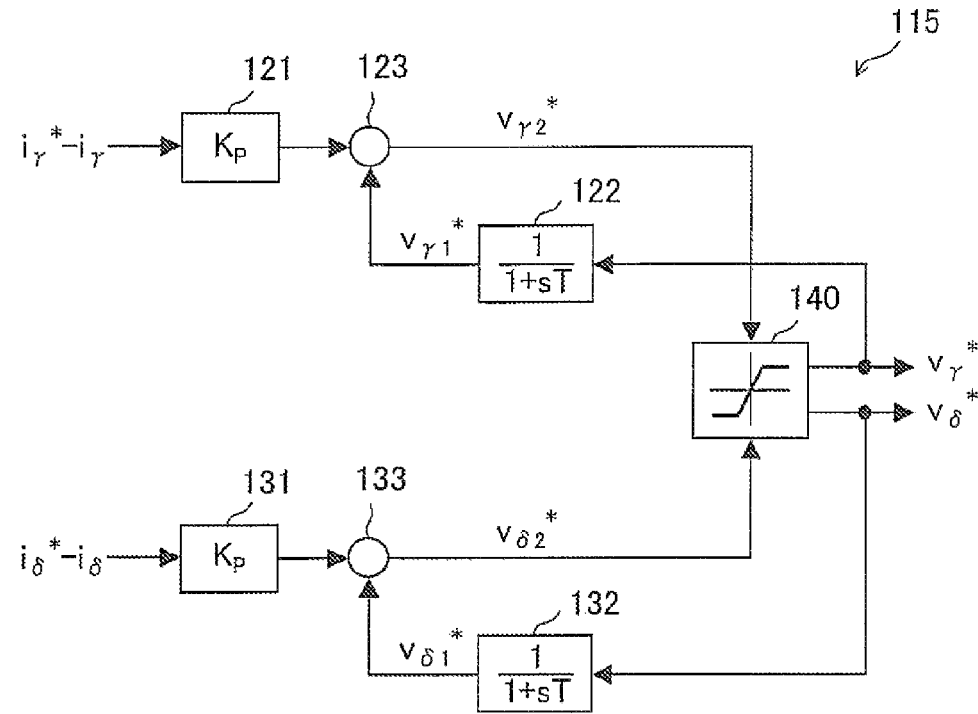
FIG. 14 is an internal block diagram of a specified voltage calculation unit illustrated in FIG. 13.

FIG. 14 illustrates an internal block diagram of the specified voltage calculation unit 115. The specified voltage calculation unit 115 includes multiplier units 121 and 131, LPFs 122 and 132, adder units 123 and 133, and a limit unit 140. The values of $i_\gamma^*$, $i_\gamma$, $i_\delta^*$ and $i_\delta$ that are supplied to the specified voltage calculation unit 115 are updated at a predetermined update period, and the specified voltage calculation unit 115 updates $v_\gamma^*$ and $v_\delta^*$ output by itself, at a predetermined update period.

The value ($i_\gamma^* - i_\gamma$) which is difference information between the target value and the detection value (or the estimated value) of the $\gamma$-axis current is supplied to the multiplier unit 121, and the value ($i_\delta^* - i_\delta$) which is difference information between the target value and the detection value (or the estimated value) of the $\delta$-axis current is supplied to the multiplier unit 131. The multiplier unit 121 multiplies a predetermined proportional gain $K_P$ to ($i_\gamma^* - i_\gamma$) and outputs the result value $K_P \cdot (i_\gamma^* - i_\gamma)$. The multiplier unit 131 multiplies the predetermined proportional gain $K_P$ to ($i_\delta^* - i_\delta$) and outputs the result value $K_P \cdot (i_\delta^* - i_\delta)$.

The LPFs 122 and 132 are sequentially supplied with the latest $v_\gamma^*$ and $v_\delta^*$ output from the limit unit 140, respectively. The values $v_\gamma^*$ and $v_\delta^*$ output from the limit unit 140 are the same as $v_\gamma^*$ and $v_\delta^*$ output from the specified voltage calculation unit 115. The specified $\gamma$-axis voltage signal and the specified $\delta$-axis voltage signal having the specified values $v_\gamma^*$ and $v_\delta^*$ as signal values have various frequency components. The LPF 122 reduces predetermined high frequency components included in the specified $\gamma$-axis voltage signal that is an input signal thereof and outputs the specified $\gamma$-axis voltage signal after the reduction. Similarly, the LPF 132 reduces predetermined high frequency components included in the specified $\delta$-axis voltage signal that is an input signal thereof and outputs the specified $\delta$-axis voltage signal after the reduction. The transfer function between input and output signals of each of the LPFs 122 and 132 is the same as that of the LPF 23 illustrated in FIG. 5. The output signal values of the LPFs 122 and 132, i.e., the values of the specified $\gamma$-axis voltage signal and the specified $\delta$-axis voltage signal after high frequency components are reduced by the LPFs 122 and 132 are denoted by $v_{\gamma 1}^*$ and $v_{\delta 1}^*$, respectively, for convenience sake.

The adder unit 123 adds the output signal value $K_P \cdot (i_\gamma^* - i_\gamma)$ of the multiplier unit 121 to the output signal value $v_{\gamma 1}^*$ of the LPF 122, and outputs the result value ($v_{\gamma 1}^* + K_P \cdot (i_\gamma^* - i_\gamma)$) as the candidate value $v_{\gamma 2}^*$. Similarly, the adder unit 133 adds the output signal value $K_P \cdot (i_\delta^* - i_\delta)$ of the multiplier unit 131 to the output signal value $v_{\delta 1}^*$ of the LPF 132, and outputs the result value ($v_{\delta 1}^* + K_P \cdot (i_\delta^* - i_\delta)$) as the candidate value $v_{\delta 2}^*$. The candidate values $v_{\gamma 2}^*$ and $v_{\delta 2}^*$ are also updated sequentially at a predetermined update period similarly to $v_\gamma^*$, $v_\delta^*$ and the like.

The candidate value $v_{\gamma 2}^*$ in the n-th discretization period based on $v_{\gamma 1}^*$ and ($i_\gamma^* - i_\gamma$) in the n-th discretization period is handled as a candidate of $v_\gamma^*$ in the (n+1)th discretization period. In other words, the candidate value $v_{\gamma2}^*[n]$ based on $v_{\gamma1}^*[n]$ and $(i_\gamma^*-i_\gamma)[n]$ is handled as a candidate of $v_\gamma^*[n+1]$. Similarly, the candidate value $v_{\delta2}^*[n]$ based on $v_{\delta1}^*[n]$ and $(i_\delta^*-i_\delta)[n]$ is handled as a candidate of $v_\delta^*[n+1]$. Therefore, the signals having the candidate values $v_{\gamma2}^*$ and $v_{\delta2}^*$ as the signal values can be referred to as candidate signals as candidates of the specified γ-axis voltage signal and the specified δ-axis voltage signal, respectively.

The limit unit 140 determines the next $v_\gamma^*$ and $v_\delta^*$ by imposing a predetermined limit on $v_{\gamma2}^*$ and $v_{\delta2}^*$. For instance, the limits in accordance with the following equations (5a) and (5b) are imposed on $v_{\gamma2}^*$ and $v_{\delta2}^*$.

$$v_\gamma^* = \begin{cases} \text{sign}(v_{\gamma2}^*) \cdot V_{\gamma\,max} & (\text{if } |v_{\gamma2}^*| > V_{\gamma\,max}) \\ v_{\gamma2}^* & (\text{otherwise}) \end{cases} \quad (5a)$$

$$v_\delta^* = \begin{cases} \text{sign}(v_{\delta2}^*) \cdot \sqrt{V_{om}^2 - v_\gamma^{*2}} & (\text{if } \sqrt{v_\gamma^{*2} + v_{\delta2}^{*2}} > V_{om}) \\ v_{\delta2}^* & (\text{otherwise}) \end{cases} \quad (5b)$$

When $v_\gamma^*[n+1]$ and $v_\delta^*[n+1]$ are determined from $v_{\gamma2}^*[n]$ and $v_{\delta2}^*[n]$, $v_\gamma^*[n+1]$ is first determined, and then $v_\delta^*[n+1]$ is determined on the basis of $v_\gamma^*[n+1]$. In other words, it is decided first whether or not the first inequality "$|v_{\gamma2}^*[n]|>V_{\gamma max}$" is satisfied. If the first inequality is satisfied, $\text{sign}(v_{\gamma2}^*[n])\cdot V_{\gamma max}$ is substituted into $v_\gamma^*[n+1]$. If the first inequality is not satisfied, $v_{\gamma2}^*[n]$ is substituted into $v_\gamma^*[n+1]$. Next, it is decided whether or not the second inequality "$\sqrt{(v_\gamma^*[n+1]^2+v_{\delta2}^*[n]^2)}>V_{om}$" is satisfied. If the second inequality is satisfied, $\text{sign}(v_{\delta2}^*[n])\cdot\sqrt{(V_{om2}-v_\gamma^*[n+1]^2)}$ is substituted into $v_\delta^*[n+1]$. If the second inequality is not satisfied, $v_{\delta2}^*[n]$ is substituted into $v_\delta^*[n+1]$.

Here, $\text{sign}(v_{\gamma2}^*[n])$ is 1 if $v_{\gamma2}^*[n]\geq 0$ holds and is −1 if $v_{\gamma2}^*[n]<0$ hold. The $\text{sign}(v_{\delta2}^*[n])$ is 1 if $v_{\delta2}^*[n]\geq 0$ holds and is −1 if $v_{\delta2}^*[n]<0$ holds. $V_{\gamma max}$ is a predetermined limit voltage value that is determined on the basis of the DC voltage $V_{dc}$ supplied to the inverter 2. $V_{om}$ that is used for the limit unit 140 is the same as that described above in the first embodiment.

The value $\sqrt{(v_\gamma^{*2}+v_\delta^{*2})}$ which represents a magnitude of the specified voltage value (in other word, a magnitude of the specified voltage signal which includes the values $v_\gamma^*$ and $v_\delta^*$ as signal components) is limited to be $V_{om}$ or lower by the limiting process as described above. In this case, $v_\gamma^*$ is determined with higher priority than $v_\delta^*$. This is because that the γ-axis current is current for controlling the field magnetic flux so as to limit induction voltage (i.e., electromotive force) generated in the motor 1, and therefore the γ-axis voltage for supplying the γ-axis current should have higher priority when voltage saturation occurs. Therefore, as described above, the specified γ-axis voltage value is limited by a desired limit voltage value $V_{\gamma max}$ with priority, and on the basis of the result, the specified δ-axis voltage value is limited. By limiting the specified γ-axis voltage value, the lower limit of the specified δ-axis voltage value can be secured. But the limit of the specified γ-axis voltage value should be performed if necessary, or it may be omitted. In other words, $v_{\gamma2}^*[n]$ may be always substituted into $v_\gamma^*[n+1]$ without satisfying the above equation (5a).

Figure 26:
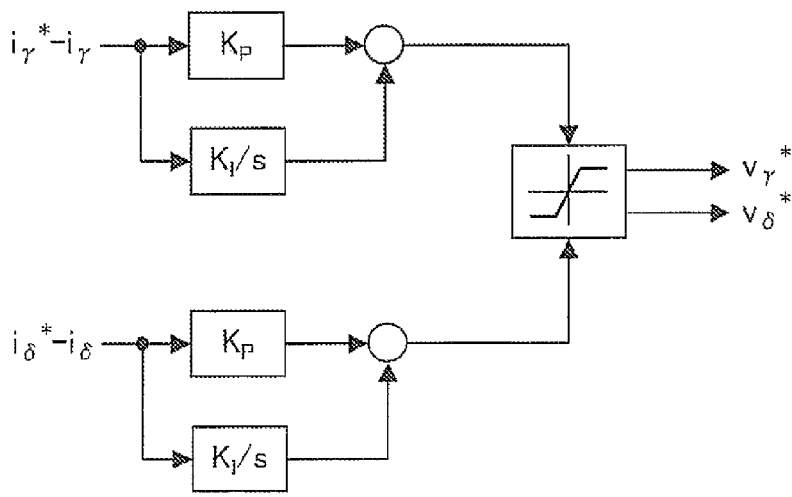
FIG. 26 is a block diagram of a configuration of generating a specified voltage signal from current difference information using PI control.

If the limiting process is omitted, the transfer function of the block of generating the output signal $v_\gamma^*$ from the input signal $(i_\gamma^*-i_\gamma)$ (i.e., block including the units 121 to 123) is $K_P(1+1/sT)$ (the same is true for the δ-axis component). On the other hand, if the limiting process is omitted similarly, the transfer function of the PI controller illustrated in FIG. 26 is $K_P(1+K_1/K_Ps)$. $K_P$ is the proportional gain as described above, and $K_1$ is an integral gain in the PI control. The specified voltage calculation unit 115 can obtain the $v_\gamma^*$ and $v_\delta^*$ that are similar to those in the case where the PI controller is used, from $(i_\gamma^*-i_\gamma)$ and $(i_\delta^*-i_\delta)$. If T that satisfies $K_P(1+1/sT)=K_P(1+K_1/K_Ps)$ is used, the specified voltage calculation unit 115 can have a characteristic that is the same as that in the desired PI control. In other words, if the proportional gain $K_P$ that is the same as the proportional gain in the PI control is used in the multiplier units 121 and 131, and if the time constant T that satisfies $T=K_P/K_1$ is used in the LPFs 122 and 132, the specified voltage calculation unit 115 can have a characteristic that is the same as that of the desired PI control. This method of determining the time constant T can be applied to the first embodiment described above and other embodiments described later (in the first embodiment, $K_{dis}$ corresponds to the proportional gain, see FIG. 6).

[Variation Example of LPF Location]

In the specified voltage calculation unit 115 illustrated in FIG. 14, the specified voltage signal is corrected by adding values corresponding to the current difference information $(i_\gamma^*-i_\gamma)$ and $(i_\delta^*-i_\delta)$ to the signals $(v_{\gamma1}^*$ and $v_{\delta1}^*)$ that are obtained when the specified voltage signals $(v_\gamma^*$ and $v_\delta^*)$ pass through the LPFs 122 and 132. The signal values after the correction are $v_{\gamma2}^*$ and $v_{\delta2}^*$, and the correction is performed until $(i_\gamma^*-i_\gamma)$ and $(i_\delta^*-i_\delta)$ become zero.

Figure 15:
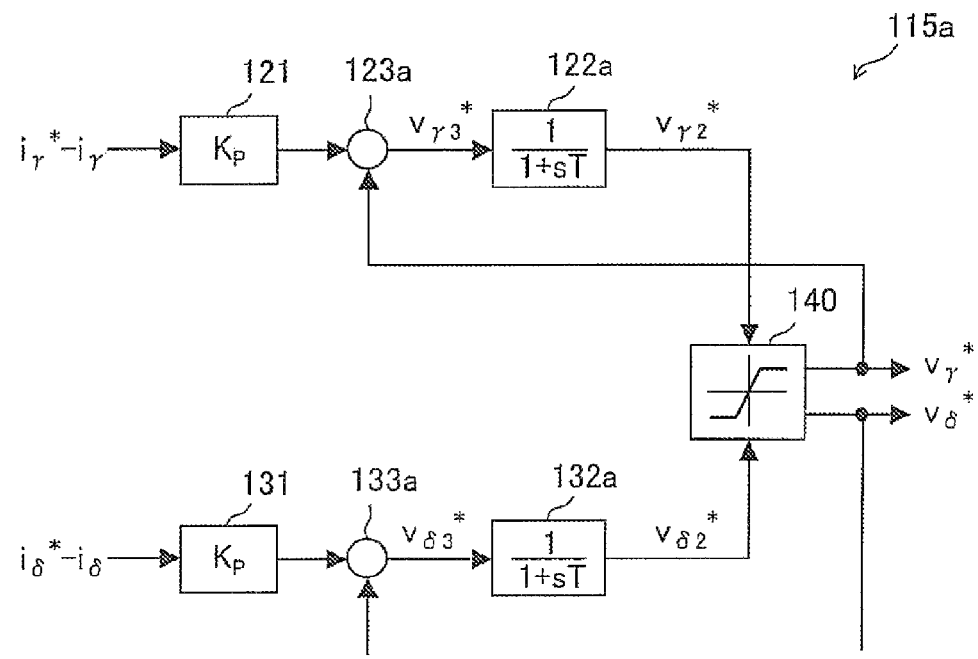
FIG. 15 is an internal block diagram of a variation of the specified voltage calculation unit illustrated in FIG. 13.

In this way, the specified voltage calculation unit 115 illustrated in FIG. 14 performs the low pass filter process before the correction by the current difference information. However, it is possible to perform the low pass filter process after the correction. In other words, it is possible to dispose the specified voltage calculation unit 115a illustrated in FIG. 15 instead of the specified voltage calculation unit 115 in the motor control device $3_B$, and to generate $v_\gamma^*$ and $v_\delta^*$ by using the specified voltage calculation unit 115a. FIG. 15 is a block diagram of the specified voltage calculation unit 115a.

The specified voltage calculation unit 115a includes the multiplier units 121 and 131. LPFs 122a and 132a, an adder units 123a and 133a, and the limit unit 140. In the specified voltage calculation unit 115a, the multiplier units 121 and 131 calculates the values $K_P\cdot(i_\gamma^*-i_\gamma)$ and $K_P\cdot(i_\delta^*-i_\delta)$ in accordance with the above-mentioned method and outputs the result. The adder units 123a and 133a add the output values of the multiplier units 121 and 131 to the values $v_\gamma^*$ and $v_\delta^*$ output from the limit unit 140 and output the addition results $(v_\gamma^*+K_P\cdot(i_\gamma^*-i_\gamma))$ and $(v_\delta^*+K_P\cdot(i_\delta^*-i_\delta))$ to the LPFs 122a and 132a, respectively. For convenience sake, it is supposed that $(v_\gamma^*+K_P\cdot(i_\gamma^*-i_\gamma))=v_{\gamma3}^*$ and $(v_\delta^*+K_P\cdot(i_\delta^*-i_\delta))=v_{\delta3}^*$ hold, and that the signal having the value $v_{\gamma3}^*$ or $v_{\delta3}^*$ as the signal value is referred to as the intermediate signal.

The LPFs 122a and 132a reduce predetermined high frequency components included in the intermediate signals $v_{\gamma3}^*$ and $v_{\delta3}^*$ that are input signals thereof and outputs the signals after the reduction as the candidate signals $v_{\gamma3}^*$ and $v_{\delta3}^*$, respectively. The transfer functions between input and output signals in the LPFs 122a and 132a are the same as those in the LPFs 122 and 132. The candidate signals $v_{\gamma2}^*$ and $v_{\delta2}^*$ are sent to the limit unit 140. The function of the limit unit 140 is the same between the specified voltage calculation units 115 and 115a. In other words, $v_{\gamma3}^*[n]$ is calculated from $v_\gamma^*[n]$ and $(i_\gamma^*-i_\gamma)[n]$, and $v_{\gamma2}^*[n]$ can be obtained by reducing high frequency components in the intermediate signal $v_{\gamma3}^*$ including $v_{\gamma3}^*[n]$ (as a matter of course, not only $v_{\gamma3}^*[n]$ but also $v_{\gamma3}^*[n-1]$ and the like are related to generation of $v_{\gamma2}^*[n]$). In the same manner, $v_{\delta2}^*[n]$ is also obtained. Then, a predetermined limit is imposed on $v_{\gamma2}*[n]$ and $v_{\delta2}*[n]$ so that $v_\gamma*[n+1]$ and $v_\delta*[n+1]$ are generated.

Supposing that the n-th discretization period is a reference, $v_\gamma*[n+1]$ corresponds to the specified γ-axis voltage signal after the update, and the specified γ-axis voltage signal before the update corresponds to the specified γ-axis voltage signal before $v_\gamma*[n+1]$ (i.e., $v_\gamma*[n]$ or $v_\gamma*[n-i]$ to $v_\gamma*[n]$) (i is a natural number). The same is true for the δ-axis component.

The specified voltage calculation unit 115 illustrated in FIG. 14 corrects the signals obtained when the specified voltage signals before the update pass through the LPFs 122 and 132 by using the current difference information ($i_\gamma*-i_\gamma$) and ($i_\delta*-i_\delta$), so that the candidate signals ($v_{\gamma2}*$ and $v_{\delta2}*$) are generated. On the other hand, the specified voltage calculation unit 115a illustrated in FIG. 15 corrects the specified voltage signals before the update by using the above-mentioned difference information, and then the corrected signals pass through the LPFs 122a and 132a so that the candidate signals ($v_{\gamma2}*$ and $v_{\delta2}*$) are generated. In the specified voltage calculation unit 115 or 115a, the limit unit 140 imposes a predetermined limit on the signal value of the candidate signal (i.e., candidate value $v_{\gamma2}*$ or $v_{\delta2}*$) so as to generate the specified voltage signal after the update.

In the specified voltage calculation unit 115 illustrated in FIG. 14, the part including the multiplier units 121 and 131, the LPFs 122 and 132, and the adder units 123 and 133 functions as the candidate signal generation unit. On the other hand, in the specified voltage calculation unit 115a illustrated in FIG. 15, the part including the multiplier units 121 and 131, LPFs 122a and 132a, and the adder units 123a and 133a functions as the candidate signal generation unit.

In this embodiment, the specified voltage signal ($v_\gamma*$, $v_\delta*$) is generated without using a PI controller. Therefore, the anti-windup measure in the specified voltage calculation unit becomes unnecessary, so that the process can be simplified.

Third Embodiment

A third embodiment of the present invention will be described. The method without using the PI controller described above in the first embodiment can be used for generating a specified value or the like other than $I_\gamma*$. In the third embodiment, this method is used for generating the specified δ-axis current signal.

Figure 16:
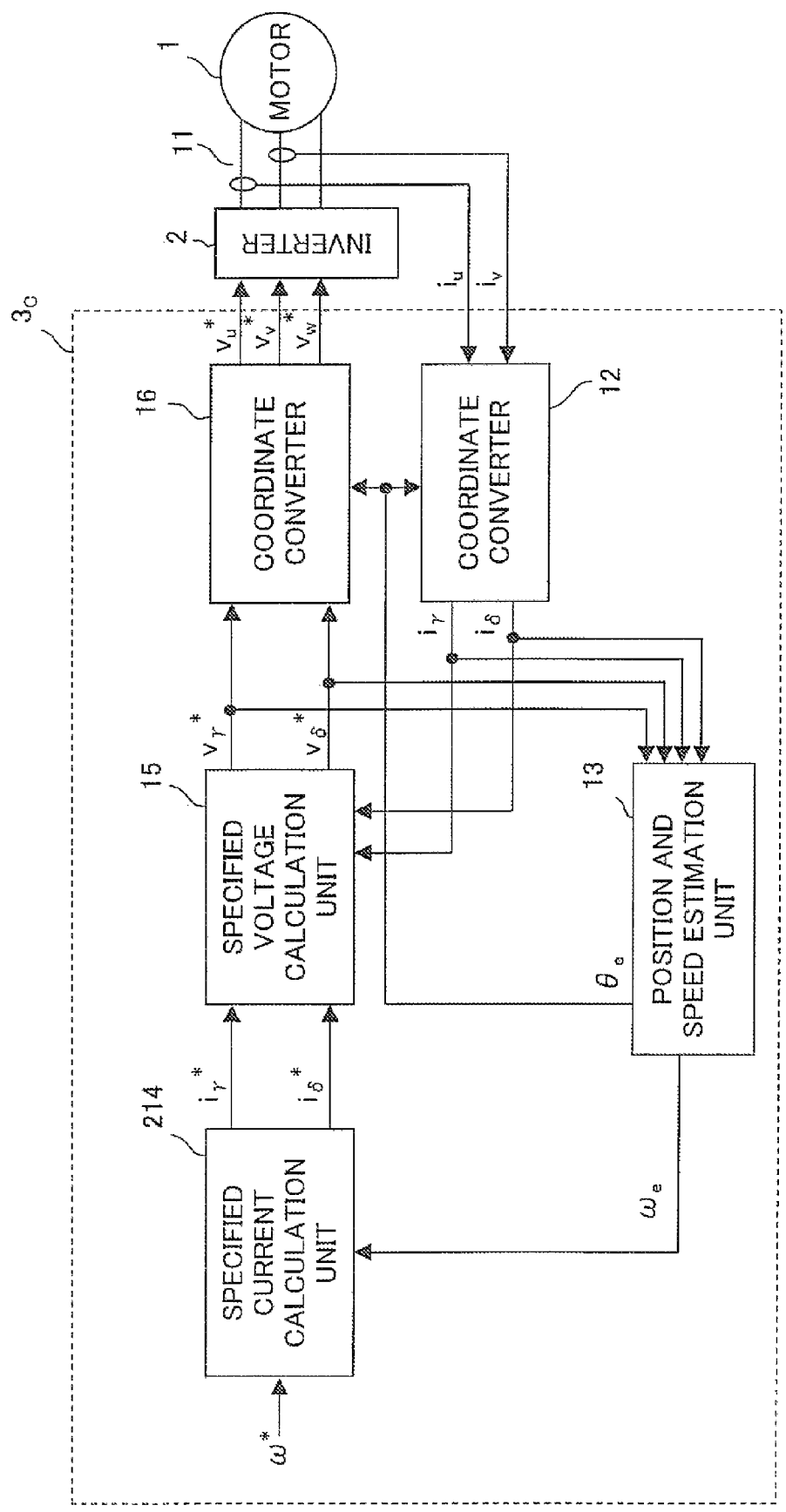
FIG. 16 is a detail block diagram of a motor drive system according to a third embodiment of the present invention.

FIG. 16 is a detail block diagram of a motor drive system according to the third embodiment. The motor drive system illustrated in FIG. 16 includes the motor 1 and the inverter 2 illustrated in FIG. 1, a motor control device $3_C$ that functions as the motor control device 3 illustrated in FIG. 1, and a phase current sensor 11. The motor control device $3_C$ includes individual units denoted by numerals 12, 13, 214, 15 and 16. The coordinate converters 12 and 16, the position and speed estimation unit 13, and the specified voltage calculation unit 15 in the motor control device $3_C$ illustrated in FIG. 16 are the same as those in the first embodiment (see FIG. 3). As the specified voltage calculation unit 15 in the motor control device $3_C$, the specified voltage calculation unit 115 or 115a described above in the second embodiment may be used (see FIGS. 14 and 15). In the third embodiment too, similarly to the first embodiment, it is supposed that the rotor position $\theta_e$ and the rotation speed $\omega_e$ are estimated so that the axial error $\Delta\theta$ becomes zero.

The specified current calculation unit 214 calculates the speed deviation ($\omega*-\omega_e$), calculates the specified δ-axis current value $i_\delta*$ so that the speed deviation ($\omega*-\omega_e$) converges to zero, and outputs the same. Further, the specified current calculation unit 214 utilizes $i_\delta*$ and the like if necessary, so as to calculate the specified γ-axis current value $i_\gamma*$ for realizing the desired vector control (maximum torque control or the flux-weakening control). It is possible to dispose the $i_\gamma*$ update unit 20 illustrated in FIG. 5 or the $i_\gamma*$ update unit 20a illustrated in FIG. 9 in the specified current calculation unit 214 and to calculate $i_\gamma*$ by using the $i_\gamma*$ update unit 20 or 20a. The specified values $i_\gamma*$ and $i_\delta*$ calculated by the specified current calculation unit 214 are supplied to the specified voltage calculation unit 15.

Figure 17:
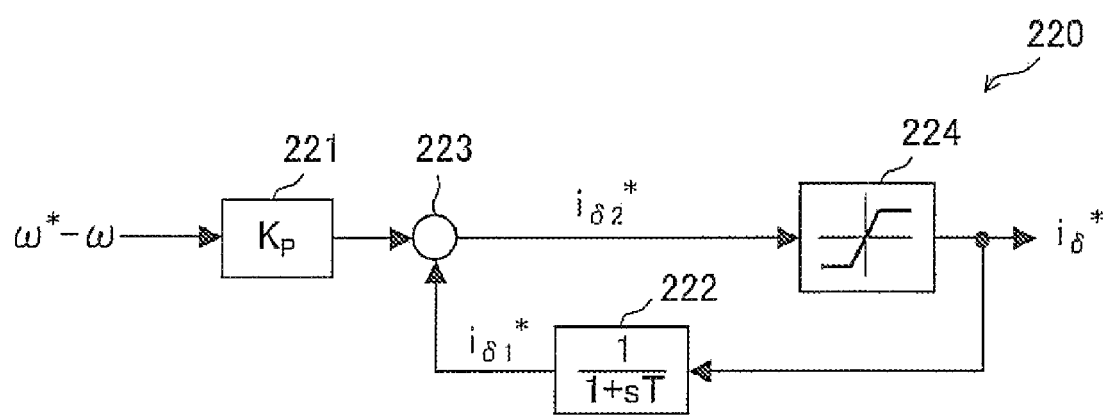
FIG. 17 is an internal block diagram of an $i_\delta^*$ update unit disposed in a specified current calculation unit illustrated in FIG. 16.

The specified current calculation unit 214 calculates $i_\delta*$ by the method without using the PI control. FIG. 17 illustrates an internal block diagram of the $i_\delta*$ update unit 220 disposed in the specified current calculation unit 214. The $i_\delta*$ update unit 220 includes a multiplier unit 221, an LPF 222, an adder unit 223 and a limit unit 224. The $i_\delta*$ update unit 220 updates $i_\delta*$ output by itself at a predetermined update period.

The motor control device $3_C$ derives the rotation speed $\omega_e$ by the estimation process based on $i_\gamma$ and the like, but it is possible to detect the rotation speed $\omega_e$ by using a sensor (not shown) (see fifth embodiment that will be described later). Difference information ($\omega*-\omega_e$) between the target value of the rotation speed of the motor 1 and the detection value or the estimated value of the same is supplied to the multiplier unit 221. The multiplier unit 221 multiplies a predetermined proportional gain $K_P$ to ($\omega*-\omega_e$) and outputs the result value $K_P \cdot (\omega*-\omega_e)$.

The LPF 222 is sequentially supplied with the latest $i_\delta*$ that is output from the limit unit 224. The specified value $i_\delta*$ output from the limit unit 224 is the same as $i_\delta*$ output from the specified current calculation unit 214. The specified δ-axis current signal having the specified value $i_\delta*$ as the signal value has various frequency components. The LPF 222 reduces predetermined high frequency components included in the specified δ-axis current signal that is the input signal thereof and outputs the specified δ-axis current signal after the reduction. The transfer function between input and output signals in the LPF 222 is the same as that of the LPF 23 illustrated in FIG. 5. The output signal value of the LPF 222, i.e., a value of the specified δ-axis current signal after the high frequency components are reduced by the LPF 222 is denoted by $i_{\delta1}*$ for convenience sake.

The adder unit 223 adds the output signal value $K_P \cdot (\omega*-\omega_e)$ of the multiplier unit 221 to the output signal value $i_{\delta1}*$ of the LPF 222 and outputs the result value ($i_{\delta1}*+K_P \cdot (\omega*-\omega_e)$) as the candidate value $i_{\delta2}*$. The candidate value $i_{\delta2}*$ is also updated sequentially at a predetermined update period similarly to $i_{\delta1}*$ and the like.

The candidate value $i_{\delta2}*$ in the n-th discretization period based on $i_{\delta1}*$ and ($\omega*-\omega_e$) in the n-th discretization period is handled as a candidate of $i_\delta*$ in the (n+1)th discretization period. In other words, the candidate value $i_{\delta2}*[n]$ based on $i_{\delta1}*[n]$ and ($\omega*-\omega_e$)[n] is handled as a candidate of $i_\delta*[n+1]$. Therefore, the signal having the candidate value $i_{\delta2}*$ as the signal value can be referred to as a candidate signal as a candidate of the specified δ-axis current signal.

The limit unit 224 imposes a predetermined limit on $i_{\delta2}*$ so as to determine the next $i_\delta*$. This limit is a limit that does not exceed a predetermined limit value $i_{\gamma L}*$. The limit value $i_{\delta L}*$ (for example, $i_{\delta L}*[n]$ in the n-th discretization period) can be a constant value corresponding to a characteristic of the motor 1 and the like. For instance, the limit value $i_{\delta L}*[n]$ and the candidate value $i_{\delta2}*[n]$ are compared with each other. If the inequality $i_{\delta L}*[n] \geq i_{\delta2}*[n]$ holds, the candidate value $i_{\delta2}*[n]$ is output as $i_\delta*[n+1]$. On the contrary, if the inequality $i_{\delta L}*[n] < i_{\delta2}*[n]$ holds, the limit value $i_{\delta L}*[n]$ is output as $i_\delta*[n+1]$. Thus, the specified δ-axis current value $i_\delta*$ is limited to be always the limit value $i_{\delta L}*$ or lower.

[Variation Example of LPF Location]

The $i_\delta^*$ update unit 220 illustrated in FIG. 17 corrects the specified δ-axis current signal by adding a value corresponding to the difference information ($\omega^*-\omega_e$) of the rotation speed to the signal $i_\delta^*$ obtained when the specified δ-axis current signal passes through the LPF 222. The signal value after the correction is $i_{\delta 2}^*$, and the correction is performed until ($\omega^*-\omega_e$) becomes zero.

Figure 18:
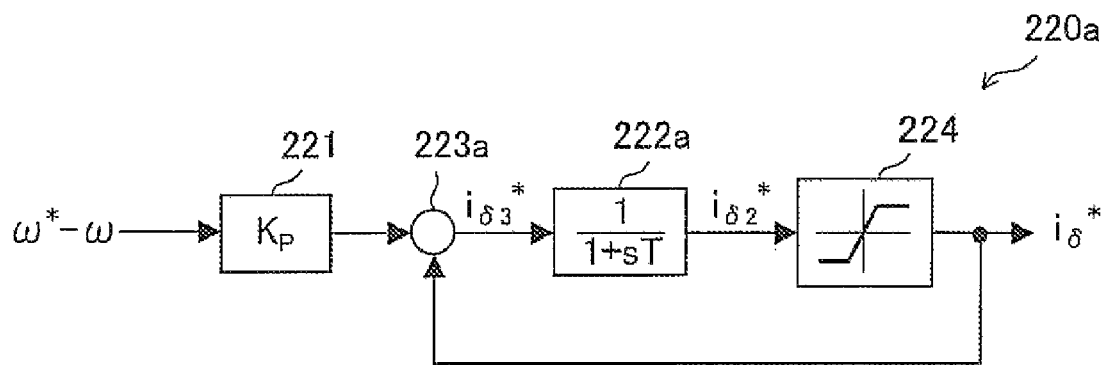
FIG. 18 is an internal block diagram of a variation of the $i_\delta^*$ update unit disposed in the specified current calculation unit illustrated in FIG. 16.

In this way, the $i_\delta^*$ update unit 220 illustrated in FIG. 17 performs the low pass filter process before the correction by the difference information of the rotation speed. However, it is possible to perform the low pass filter process after the correction. In other words, instead of the $i_\delta^*$ update unit 220 illustrated in FIG. 17, the $i_\delta^*$ update unit 220a illustrated in FIG. 18 may be disposed in the specified current calculation unit 214 illustrated in FIG. 16, so that $i_\delta^*$ can be generated by using the $i_\delta^*$ update unit 220a. FIG. 18 is a block diagram of the $i_\delta^*$ update unit 220a.

The $i_\delta^*$ update unit 220a includes the multiplier unit 221, an LPF 222a, an adder unit 223a and the limit unit 224. In the $i_\delta^*$ update unit 220a, the multiplier unit 221 calculates the value $K_P \cdot (\omega^*-\omega_e)$ in accordance with the above-mentioned method and outputs the same. The adder unit 223a adds the output value of the multiplier unit 221 to $i_\delta^*$ output from the limit unit 224 and outputs the addition result ($i_\delta^* + K_P \cdot (\omega^* - \omega_e)$) to the LPF 222a. For convenience sake, it is supposed that ($i_\delta^* + K_P \cdot (\omega^* - \omega_e)) = i_{\delta 3}^*$, holds, and the signal having the value $i_{\delta 3}^*$ as the signal value is referred to as the intermediate signal.

The LPF 222a reduces predetermined high frequency components included in the intermediate signal $i_{\delta 3}^*$ that is an input signal thereof, and outputs the signal after the reduction as the candidate signal $i_{\delta 2}^*$. The transfer function between input and output signals in the LPF 222a is the same as that in the LPF 222. The candidate signal $i_{\delta 2}^*$ is sent to the limit unit 224. The function of the limit unit 224 is the same between the $i_\delta^*$ update units 220 and 220a. In other words, $i_{\delta 3}^*[n]$ is calculated from $i_\delta^*[n]$ and ($\omega^*-\omega_e$)[n], high frequency components of the intermediate signal $i_{\delta 3}^*$ including $i_{\delta 3}^*[n]$ is reduced so that $i_{\delta 2}^*[n]$ can be obtained (as a matter of course, not only $i_{\delta 3}^*[n]$ but also $i_{\delta 3}^*[n-1]$ and the like are related to generation of $i_{\delta 2}^*[n]$). Then, a predetermined limit is imposed on $i_{\delta 2}^*[n]$ so that $i_\delta^*[n+1]$ is generated.

Considering with reference to the n-th discretization period, $i_\delta^*[n+1]$ corresponds to the specified δ-axis current signal after the update, and the specified δ-axis current signal before the update corresponds to the specified δ-axis current signal before $i_\delta^*[n+1]$ (i.e., $i_\delta^*[n]$ or $i_\epsilon^*[n-i]$ to $i_\delta^*[n]$) (i is a natural number).

The $i_\delta^*$ update unit 220 illustrated in FIG. 17 corrects the signal obtained when the specified δ-axis current signal before the update passes through the LPF 222 by using difference information of the rotation speed ($\omega^*-\omega_e$), so as to generate the candidate signal $i_{\delta 2}^*$. On the other hand, the $i_\delta^*$ update unit 220a illustrated in FIG. 18 corrects the specified δ-axis current signal before the update by using the above-mentioned difference information, and then the corrected signal passes through the LPF 222a so that the candidate signal $i_{\delta 2}^*$ is generated. In the $i_\delta^*$ update unit 220 or 220a, the limit unit 224 imposes a predetermined limit on the signal value of the candidate signal (i.e., the candidate value $i_{\delta 2}^*$) so as to generate the specified δ-axis current signal after the update.

In the $i_\delta^*$ update unit 220 illustrated in FIG. 17, the part including the multiplier unit 221, the LPF 222 and the adder unit 223 functions as the candidate signal generation unit. On the other hand, in the $i_\delta^*$ update unit 220a illustrated in FIG. 18, the part including the multiplier unit 221, the LPF 222a and the adder unit 223a functions as the candidate signal generation unit.

[About Specified Torque]

Note that the individual units illustrated in FIGS. 17 and 18 output the current information in the above description. However, it is possible to adopt a configuration in which the individual units illustrated in FIGS. 17 and 18 output torque information. In other words, the limit unit 224 illustrated in FIG. 17 may output a specified torque value trq*, and therefore the LPF 222 and the adder unit 223 may output $trq_1^*$ and $trq_2^*$, respectively. Similarly, the limit unit 224 illustrated in FIG. 18 may output the specified torque value trq*, and therefore the LPF 222a and the adder unit 223a may output $trq_2^*$ and $trq_3^*$, respectively. The operation for the individual units illustrated in FIGS. 17 and 18 to output the torque information is similar to the operation for the individual units illustrated in FIGS. 17 and 18 to output the current information (only the dimension of the output information is different between the former and the latter).

The trq* is expressed by $i_\delta^* \times K_T$. Therefore, $trq_1^*$, $trq_2^*$ and $trq_3^*$ are expressed by $i_{\delta 1}^* \times K_T$, $i_{\delta 2}^* \times K_T$, and $i_{\delta 3}^* \times K_T$, respectively. $K_T$ is a torque constant of the motor 1. When the specified torque value trq is output from the limit unit 224, $i_\delta^*$ is determined by dividing the specified torque value trq* by the torque constant $K_T$. The specified torque value trq* indicates a target value of the torque generated by the motor 1. The signal having the specified torque value trq* as the signal value can be referred to as a specified torque signal.

In this embodiment, the specified δ-axis current signal or the specified torque signal is generated without using the PI controller. Therefore, the anti-windup measure in the part for generating the specified δ-axis current signal or the specified torque signal becomes unnecessary, so that the process is simplified.

Fourth Embodiment

A fourth embodiment according to the present invention will be described. The method without using the PI controller described above in the first embodiment can be used for generating a specified value or the like other than $i_\gamma^*$. In the fourth embodiment, this method is used for generating estimated rotation speed $\omega_e$.

Figure 19:
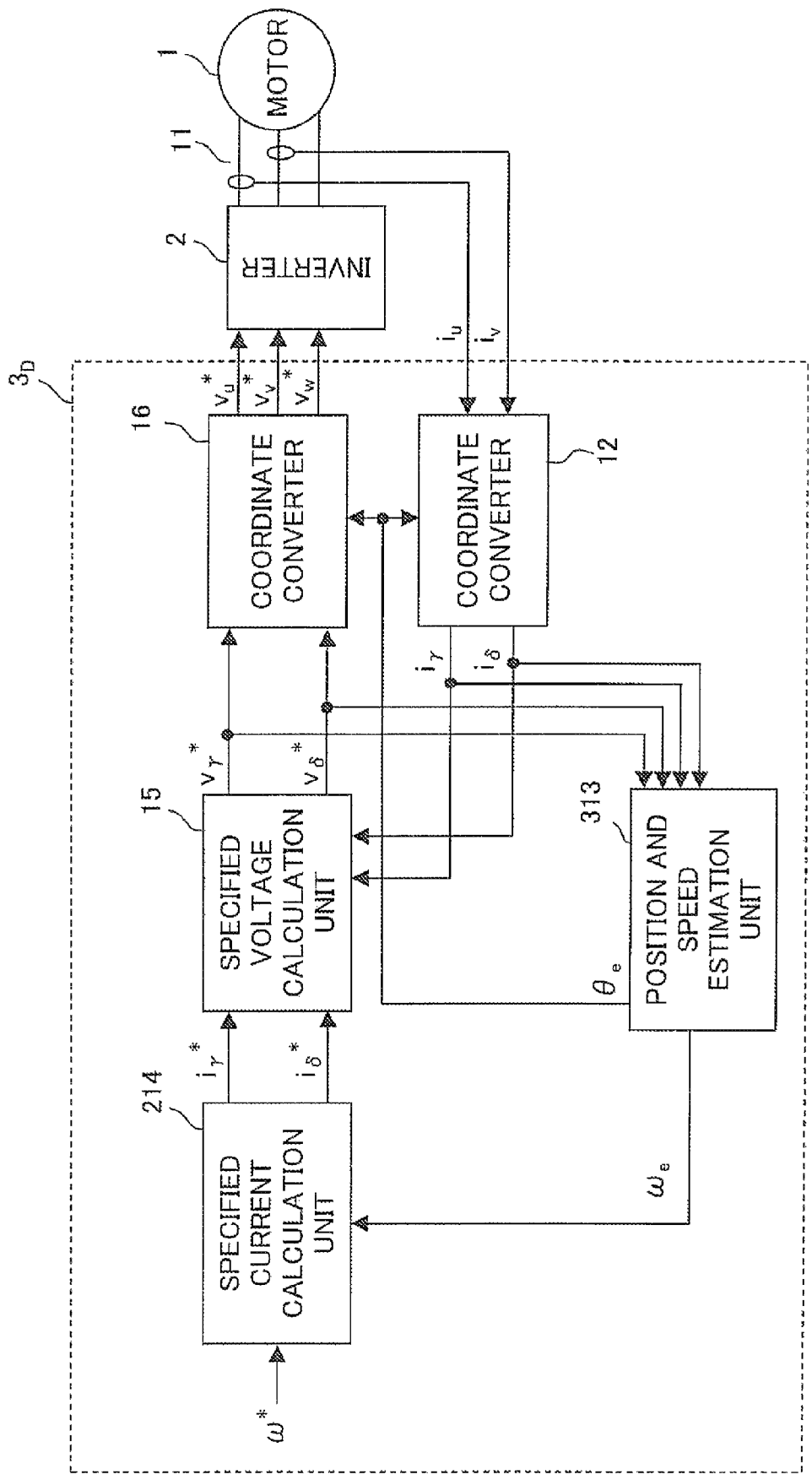
FIG. 19 is a detail block diagram of a motor drive system according to a fourth embodiment of the present invention.

FIG. 19 is a detail block diagram of a motor drive system according to the fourth embodiment. The motor drive system illustrated in FIG. 19 includes the motor 1 and the inverter 2 illustrated in FIG. 1, a motor control device $3_D$ that functions as the motor control device 3 illustrated in FIG. 1, and the phase current sensor 11. The motor control device $3_D$ includes individual units denoted by numerals 12, 313, 214, 15 and 16. The coordinate converters 12 and 16 and the specified voltage calculation unit 15 in the motor control device $3_D$ illustrated in FIG. 19 are the same as those in the first embodiment (see FIG. 3). The specified current calculation unit 214 in the motor control device $3_D$ illustrated in FIG. 19 is the same as that in the third embodiment (see FIG. 16). However, it is possible to use the specified voltage calculation unit 115 or 115a described above in the second embodiment as the specified voltage calculation unit 15 in the motor control device $3_D$ (see FIG. 14 or 15). It is also possible to use the specified current calculation unit 14 or 114 described above in the first or the second embodiment as the specified current calculation unit 214 in the motor control device $3_D$ (see FIG. 3 or 13).

Figure 20:
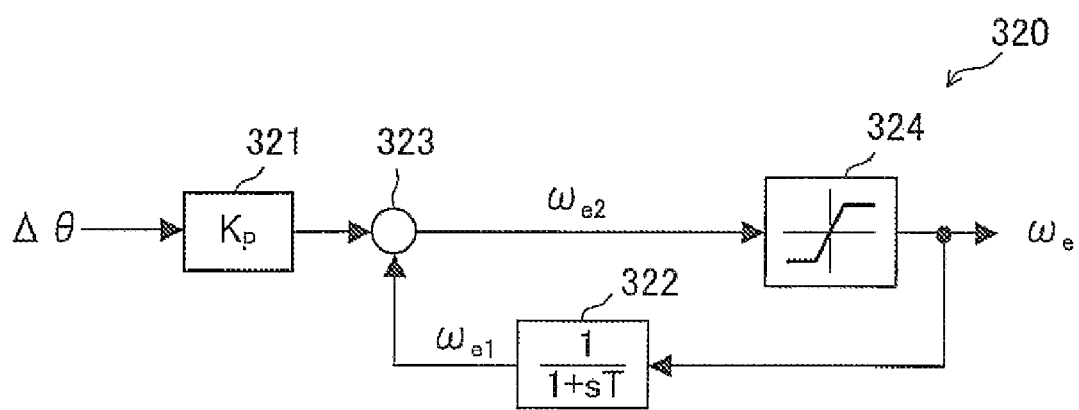
FIG. 20 is an internal block diagram of a $\omega_e$ update unit disposed in a position and speed estimation unit illustrated in FIG. 19.

In the fourth embodiment too, similarly to the first embodiment, it is supposed that the rotor position $\theta_e$ and the rotation speed $\omega_e$ are estimated so that the axial error Δθ becomes zero. The position and speed estimation unit 313 calculates $\theta_e$ and $\omega_e$ by the method without using the PI control. FIG. 20 illustrates an internal block diagram of a $\omega_e$ update unit 320 that is disposed in the position and speed estimation unit 313. The $\omega_e$ update unit 320 includes a multiplier unit 321, an LPF 322, an adder unit 323, and a limit unit 324. The $\omega_e$ update unit 320 updates $\omega_e$ output from itself, at a predetermined update period.

The multiplier unit 321 is supplied with the axial error $\Delta\theta$ between the d-axis and the $\gamma$-axis that is an estimated axis of the d-axis (see FIG. 2A). The position and speed estimation unit 313 can estimate the axial error $\Delta\theta$ by any known method. For instance, the axial error $\Delta\theta$ can be estimated on the basis of all or some of $i_\gamma$, $i_\delta$, $v_\gamma^*$ and $v_\delta^*$. The multiplier unit 321 multiplies a predetermined proportional gain $K_P$ to $\Delta\theta$ and outputs the result value $K_P \cdot \Delta\theta$.

The LPF 322 is sequentially supplied with the latest $\omega_e$ output from the limit unit 324. The rotation speed $\omega_e$ output from the limit unit 324 is the same as $\omega_e$ output from the position and speed estimation unit 313. An estimated speed signal as the rotation speed signal having the estimated rotation speed $\omega_e$ as the signal value has various frequency components. The LPF 322 reduces predetermined high frequency components included in the estimated speed signal that is an input signal thereof and outputs the estimated speed signal after the reduction. A transfer function between input and output signals of the LPF 322 is the same as that of the LPF 23 illustrated in FIG. 5. The output signal value of the LPF 322, i.e., a value of the estimated speed signal after the high frequency component is reduced by the LPF 322 is denoted by $\omega_{e1}$ for convenience sake.

The adder unit 323 adds the output signal value $K_P \cdot \Delta\theta$ of the multiplier unit 321 to the output signal value $\omega_{e1}$ of the LPF 322, and outputs the result value ($\omega_{e1}+K_P \cdot \Delta\theta$) as the candidate value $\omega_{e2}$. The candidate value $\omega_{e2}$ is also updated sequentially at a predetermined update period similarly to $\omega_e$ and the like.

The candidate value $\omega_{e2}$ in the n-th discretization period based on $\omega_{e1}$ and $\Delta\theta$ in the n-th discretization period is handled as a candidate of $\omega_e$ in the (n+1)th discretization period. In other words, the candidate value $\omega_{e2}[n]$ based on $\omega_{e1}[n]$ and $\Delta\theta[n]$ is handled as a candidate of $\omega_e[n+1]$. Therefore, the signal having the candidate value $\omega_e$, as the signal value can be referred to as a candidate signal as a candidate of the estimated speed signal.

The limit unit 324 imposes a predetermined limit on $\omega_{e2}$ so as to determine the next $\omega_e$. This limit is a limit that $\omega_e$ does not exceed a predetermined limit value $\omega_{eL}$. The limit value $\omega_{eL}$ (for example, $\omega_{eL}[n]$ in the n-th discretization period) can be a constant value corresponding to a characteristic of the motor 1 and the like. For instance, the limit value $\omega_{eL}[n]$ and the candidate value $\omega_{e2}[n]$ are compared with each other. If the inequality "$\omega_{eL}[n] \geq \omega_{e2}[n]$" holds, the candidate value $\omega_{e2}[n]$ is output as $\omega_e[n+1]$. On the contrary, if the inequality "$\omega_{eL}[n] < \omega_{e2}[n]$" holds, the limit value $\omega_{eL}[n]$ is output as $\omega_e[n+1]$. Thus, the value of the estimated rotation speed $\omega_e$ is limited to be always the limit value $\omega_{eL}$ or lower (in other word, the estimated rotation speed $\omega_e$ is limited to be always the limit speed denoted by $\omega_{eL}$ or lower). $\theta_e$ is derived by integrating $\omega_e$ output from the limit unit 324.

[Variation Example of LPF Location]

The $\omega_e$ update unit 320 illustrated in FIG. 20 corrects the estimated speed signal by adding a value corresponding to the axial error $\Delta\theta$ to a signal $\omega_{e1}$ obtained when the estimated speed signal passes through the LPF 322. The signal value after the correction is $\omega_{e2}$, and the correction is performed until $\Delta\theta$ becomes zero.

Figure 21:
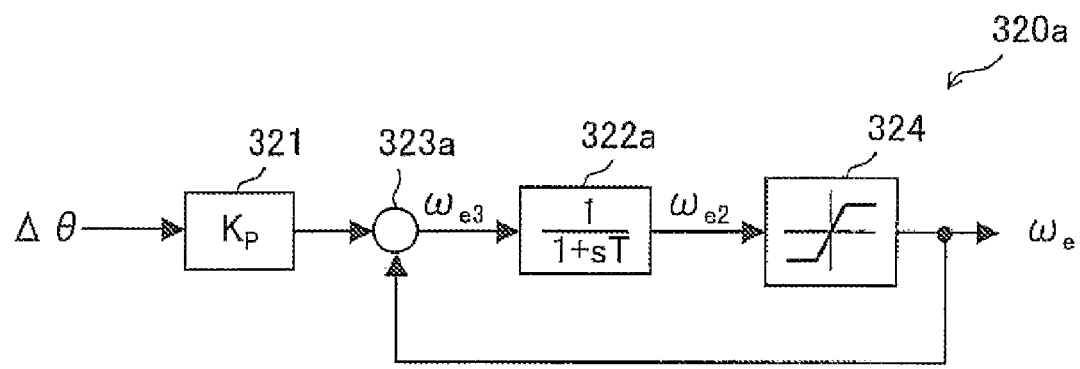
FIG. 21 is an internal block diagram of a variation of the $\omega_e$ update unit disposed in the position and speed estimation unit illustrated in FIG. 19.

In this way, the $\omega_e$ update unit 320 illustrated in FIG. 20 performs the low pass filter process before the correction based on the axial error $\Delta\theta$. However, it is possible to perform the low pass filter process after the correction. In other words, instead of the $\omega_e$ update unit 320 illustrated in FIG. 20, a $\omega_e$ update unit 320a illustrated in FIG. 21 may be disposed in the position and speed estimation unit 313 illustrated in FIG. 19, so that $\omega_e$ is generated by using the $\omega_e$ update unit 320a. FIG. 21 is a block diagram of the $\omega_e$ update unit 320a.

The $\omega_e$ update unit 320a includes the multiplier unit 321, an LPF 322a, an adder unit 323a, and the limit unit 324. In the $\omega_e$ update unit 320a, the multiplier unit 321 calculates the value $K_P \cdot \Delta\theta$ in accordance with the above-mentioned method and outputs the same. The adder unit 323a adds the output value of the multiplier unit 321 to $\omega_e$ output from the limit unit 324 and outputs the addition result ($\omega_e+K_P \cdot \Delta\theta$) to the LPF 322a. For convenience sake, it is supposed that ($\omega_e+K_P \cdot \Delta\theta$) $=\omega_{e3}$ holds, and the signal having $\omega_{e3}$ as the signal value is referred to as the intermediate signal.

The LPF 322a reduces predetermined high frequency components included in the intermediate signal $\omega_{e3}$ that is an input signal thereof and outputs the signal after the reduction as the candidate signal $\omega_{e2}$. The transfer function between input and output signals of the LPF 322a is the same as that of the LPF 322. The candidate signal $\omega_{e2}$ is sent to the limit unit 324. The function of the limit unit 324 is the same between the $\omega_e$ update units 320 and 320a. In other words, $\omega_{e3}[n]$ is calculated from $\omega_e[n]$ and $\Delta\theta[n]$, and high frequency components of the intermediate signal $\omega_{e3}$ including $\omega_{e3}[n]$ are reduced so that $\omega_{e2}[n]$ can be obtained (as a matter of course, not only $\omega_{e3}[n]$ but also $\omega_{e3}[n-1]$ and the like are related to generation of the $\omega_{e2}[n]$). Further, a predetermined limit is imposed on $\omega_{e2}[n]$, so that $\omega_e[n+1]$ is generated.

Considering with reference to the n-th discretization period, $\omega_e[n+1]$ corresponds to the estimated speed signal after the update, and the estimated speed signal before the update corresponds to the estimated speed signal before $\omega_e[n+1]$ (i.e., $\omega_e[n]$ or $\omega_e[n-i]$ to $\omega_e[n]$) (i is a natural number).

The $\omega_e$ update unit 320 illustrated in FIG. 20 corrects the signal obtained when the estimated speed signal before the update passes through the LPF 322 by using the axial error $\Delta\theta$, so as to generate the candidate signal $\omega_{e2}$. On the other hand, the $i_\delta^*$ update unit 320a illustrated in FIG. 21 corrects the estimated speed signal before the update by using the axial error $\Delta\theta$, and then the corrected signal passes through LPF 322a so that the candidate signal $\omega_{e2}$ is generated. In the $\omega_e$ update unit 320 or 320a, the limit unit 324 imposes a predetermined limit on the signal value of the candidate signal (i.e., the candidate value $\omega_{e2}$) so as to generate the estimated speed signal after the update.

In the $\omega_e$ update unit 320 illustrated in FIG. 20, the part including the multiplier unit 321, the LPF 322 and the adder unit 323 functions as the candidate signal generation unit. On the other hand, in the $\omega_e$ update unit 320a illustrated in FIG. 21, the part including the multiplier unit 321, LPF 322a and the adder unit 323a functions as the candidate signal generation unit.

In this embodiment, the estimated speed signal is generated without using the PI controller. Therefore, the anti-windup measure in the part for generating the estimated speed signal becomes unnecessary, so that the process can be simplified.

Fifth Embodiment

The motor drive systems according to the first to the third embodiments perform sensorless vector control without using a position sensor. However, techniques described above in the first to the third embodiments are useful also in the case where the position sensor is disposed. The motor drive system with the position sensor is described as the fifth embodiment of the present invention. The descriptions in the first to the third embodiments can be applied to the fifth embodiment too, as long as no contradiction arises.

Figure 22:
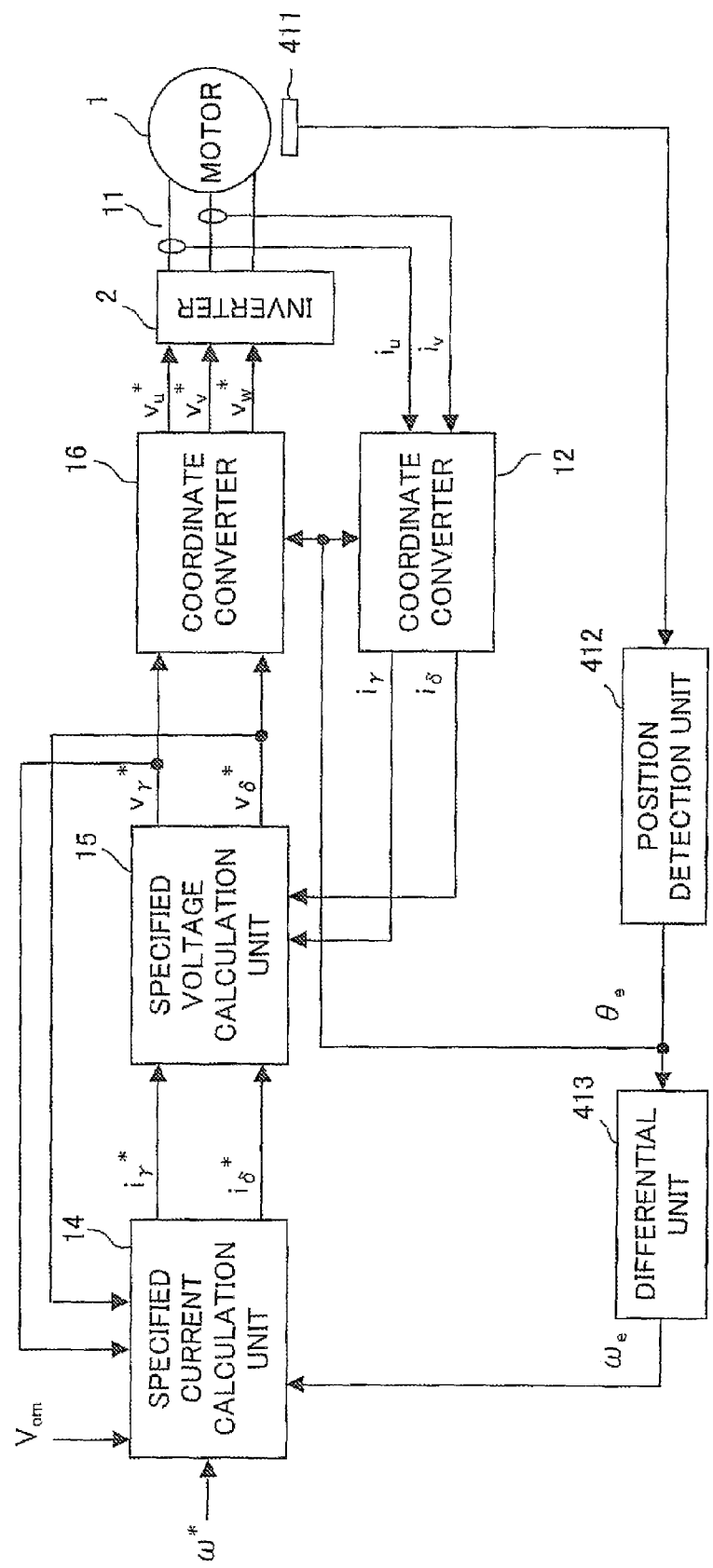
FIG. 22 is a detail block diagram of a motor drive system according to a fifth embodiment of the present invention.

For specific description, a configuration in which a position sensor and a position detection unit are added to the motor drive system of the first embodiment illustrated in FIG. 3 will be described. A block diagram of the motor drive system having this configuration is illustrated in FIG. 22. The motor drive system illustrated in FIG. 22 is similar to the motor drive system illustrated in FIG. 3 except for the point that $\theta_e$ and $\omega_e$ are derived on the basis of the output signal of the position sensor and therefore the position and speed estimation unit 13 become unnecessary.

A position sensor 411 is constituted of a Hall element or a resolver, for example, and outputs a signal for specifying a magnetic pole position of the permanent magnet 1a of the motor 1 (i.e., a signal for specifying the angle θ). A position detection unit 412 detects the d-axis phase viewed from the U-phase armature winding fixed axis on the basis of the output signal of the position sensor 411. The detected phase (rotor position) is handled as $\theta_e$. By the position detection unit 412, the detected rotor position $\theta_e$ ideally agrees with θ illustrated in FIG. 2A completely and is supplied to the coordinate converters 12 and 16. In addition, $\theta_e$ is differentiated by a differential unit 413 so that $\omega_e$ is obtained, and $\omega_e$ is supplied to the specified current calculation unit 14.

With the configuration of the motor drive system like the fifth embodiment too, the effect similar to the first embodiment can be obtained naturally. Although the case where the method of deriving $\theta_e$ and $\omega_e$ by using the position sensor is applied to the first embodiment is described above, the same method may be applied to the second and the third embodiment. In other words, in the second and the third embodiments, the position sensor may be used for deriving $\theta_e$ and $\omega_e$.

Sixth Embodiment

Figure 23:
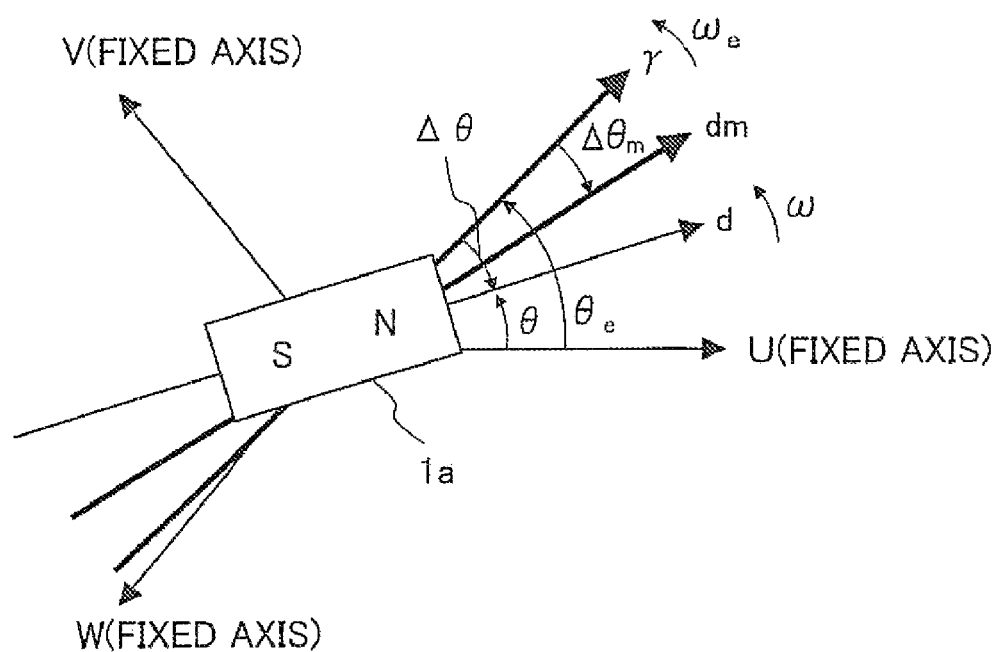
FIG. 23 is a diagram illustrating a relationship among a plurality of rotation axes and fixed axes according to a sixth embodiment of the present invention.

A sixth embodiment of the present invention will be described. In each of the above-mentioned motor drive systems, the vector control is performed so that the axial error Δθ between the d-axis and the γ-axis converges to zero, i.e., so that the γ-axis follows the d-axis. However, it is possible to perform the vector control so that the γ-axis follows an axis other than the d-axis. For instance, a dm-axis as described in JP-A-2007-259686, US2007046249 or EP1758240 may be defined, so that the vector control is performed so that the γ-axis follows the dm-axis. FIG. 23 illustrates a relationship between the dm-axis and the d-axis and the like.

The dm-axis lags behind the qm-axis by 90 degrees in electric angle. The qm-axis means a rotation axis having the same direction as the current vector to be supplied to the motor 1 for realizing the maximum torque control. The current vector to be supplied to the motor 1 means a vector expressing the current to be supplied to the motor 1.

When the vector control is performed so that the γ-axis follows the dm-axis, the process should be performed as follows, for example.

In the motor drive system of the first, the second, the third or the fourth embodiment for performing the position sensorless vector control (see FIG. 3, 13, 16 or 19); the position and speed estimation unit 13 or 313 estimates an axial error $\Delta\Gamma_m$ between the dm-axis and the γ-axis by using all or some of $i_\gamma$, $i_\delta$, $v_\gamma^*$ and $v_\delta^*$. Then, the rotor position $\theta_e$ and the rotation speed $\omega_e$ are estimated so that the axial error $\Delta\theta_m$ converges to zero by using the PI control or by using the method described above in the fourth embodiment.

In the motor drive system of the fifth embodiment (see FIG. 22), the position detection unit 412 detects a phase of the dm-axis viewed from the U-phase armature winding fixed axis on the basis of the output signal of the position sensor 411, so that the detected phase is handled as $\theta_e$.

Operations other than estimation or detection of $\theta_e$ and $\omega_e$ are the same as those described above in the embodiments described above.

If the γ-axis is made to follow the dm-axis, the δ-axis follows the qm-axis. As described above, the orientation of the qm-axis agrees with the orientation of the current vector when the maximum torque control is realized. Therefore, if the γ-axis current is set to zero, the maximum torque control can be realized. Therefore, when the method described in this embodiment is applied to the first embodiment, the above-mentioned limit value $i_{\gamma L}^*$ is set to zero (see FIG. 5 and the like). In other words, it is not necessary to calculate the limit value $i_{\gamma L}^*$ sequentially. Only by setting the limit value $i_{\gamma L}^*$ to zero, the switching between the flux-weakening control and the maximum torque control can be realized easily and smoothly.

Note that it is possible to set the qm-axis that is a rotation axis having a phase leading that of another rotation axis having the same orientation as a vector of current to be supplied to motor 1 for realizing the maximum torque control.

Variations

The numerical values specified in the above description are merely examples and can be modified to various numerical values as a matter of fact. As variation examples or annotations of the embodiments described above, Note 1 to Note 4 will be described as follows. Contents of the individual Notes can be combined in any manner as long as no contradiction arises.

[Note 1]

Any method can be used for deriving all values to be derived including the above-mentioned various specified values ($i_\gamma^*$, $i_\delta^*$, $v_\gamma^*$, $v_\delta^*$ and the like) and the state quantities ($i_\gamma$, $i_\delta$, and the like). In other words, for example, these values may be derived by calculation in the motor control device 3 or by using table data that is set in advance.

[Note 2]

A part or a whole of functions of the motor control device 3 is constituted of software (program) incorporated in a general-purpose microcomputer or the like, for example. When a motor control device 3 is realized by using software, the block diagram illustrating a configuration of each unit of the motor control device 3 indicates a function block diagram. As a matter of course, it is possible to constitute the motor control device 3 not by software (program) but by only hardware, or by a combination of software and hardware.

[Note 3]

When the γ-axis current $i_\gamma$ is supplied, the field magnetic flux is generated in the motor 1. The field magnetic flux by the negative γ-axis current $i_\gamma$ works in the direction of decreasing the field magnetic flux by the permanent magnet 1a of the motor 1. In this way, the γ-axis current $i_\gamma$ is current for generating the field magnetic flux, so it can be referred to as field current. The specified γ-axis current value $i_\gamma^*$ is a specified value to a field current component related to the field magnetic flux of the motor 1, so it can be referred to as a specified field current value, and a signal having the specified γ-axis current value $i_\gamma^*$ as the signal value can be referred to as a specified field current signal.

On the other hand, the δ-axis current $i_\delta$ is current for generating torque in the motor 1, so it can be referred to as torque current. The specified δ-axis current value $i_\delta^*$ is a specified value to a torque current component related to the torque of the motor 1, so it can be referred to as a specified torque current value, and the signal having the specified δ-axis current value $i_\delta^*$ as the signal value can be referred to as a specified torque current signal.

The specified voltage calculation unit 15 or 115 functions as a voltage specifying unit which generates the specified voltage signal ($v_\gamma^*$, $v_\delta^*$). The specified current calculation unit 14, 114 or 214 functions as a voltage specifying unit which generates the specified current signal ($i_\gamma^*$, $i_\delta^*$). In particular, the specified current calculation unit 114 illustrated in FIG. 16 (or the $i_\delta^*$ update unit 220 or 220a illustrated in FIG. 17 or 18) has a function as a specifying unit which generates the specified torque current signal or the specified torque signal.

[Note 4]

The present invention is suitable for any electric equipment using a motor, and the motor control device 3 or motor drive system described above can be mounted on any electric equipment using a motor. The electric equipment includes, for example, an electric vehicle (electric car, electric motorcycle, electric motor bicycle or the like), an air conditioner, a washing machine, and a compressor (for a refrigerator or the like), which are driven by rotation of the motor.

What is claimed is:

1. A motor control device comprising a voltage specifying unit which generates a specified voltage signal indicating a target value of an applied voltage to a motor on the basis of a specified current signal indicating a target value of supplied current to the motor, so as to control the motor in accordance with the specified voltage signal, wherein
   an update unit is further provided, which sequentially updates a specified field current signal that is a field current component of the specified current signal to be given to the voltage specifying unit on the basis of difference information between a value of the specified voltage signal and a limit voltage value defined as an upper limit value of the applied voltage,
   the update unit includes a low pass filter, and
   the specified field current signal after the update is generated on the basis of a signal obtained by passing the specified field current signal before the update through the low pass filter and the difference information, or
   the specified field current signal after the update is generated on the basis of a signal obtained by passing an intermediate signal derived from the specified field current signal before the update and the difference information through the low pass filter.

2. A motor control device according to claim 1, wherein a candidate signal generation unit which generates a candidate signal as a candidate of the specified field current signal after the update by using the low pass filter, and a limit unit which generates the specified field current signal after the update by limiting a value of the generated candidate signal to a predetermined limit value are disposed in the update unit, and
   the candidate signal generation unit generates the candidate signal by correcting the signal obtained by passing the specified field current signal before the update through the low pass filter on the basis of the difference information, or by correcting the specified field current signal before the update on the basis of the difference information so as to pass the corrected signal through the low pass filter.

3. A motor control device according to claim 2, wherein the limit value is a value of the field current component of the current to be supplied to the motor for realizing the maximum torque control.

4. A motor control device according to claim 1, wherein
   the update unit estimates a disturbance magnetic flux from the difference information and rotation speed information of the motor, and
   the specified field current signal after the update is generated via the process of correcting the signal obtained by passing the specified field current signal before the update through the low pass filter on the basis of the estimated disturbance magnetic flux, or
   the specified field current signal after the update is generated via the process of correcting the specified field current signal before the update on the basis of the estimated disturbance magnetic flux so as to pass the corrected signal through the low pass filter.

5. A motor control device according to claim 1, wherein the update unit changes the limit voltage value in accordance with a change state of rotation speed of the motor.

6. A motor control device according to claim 5, wherein a predetermined first voltage value is used as the limit voltage value in a period while the rotation speed of the motor is changing and in a period until a predetermined time passes after the time point of transition from the state where the rotation speed of the motor is changing to the state where the rotation speed of the motor is maintained to be a constant speed, while a second voltage value that is larger than the first voltage value is used as the limit voltage value in the other period.

7. A motor control device according to claim 6, wherein the second voltage value is, or the first and the second voltage values are a voltage value in an overmodulation region, and the voltage value in the overmodulation region means a value of voltage to be applied to the motor when an inverter that drives the motor performs the overmodulation.

8. A motor drive system comprising:
   a motor,
   an inverter which drives the motor, and
   the motor control device according to claim 1, which controls drive of the motor via the inverter.

9. A motor control device comprising a voltage specifying unit which generates a specified voltage signal indicating a target value of an applied voltage to a motor on the basis of difference information between a target value of supplied current to the motor and a detection value or an estimated value of the supplied current, so as to control the motor in accordance with the specified voltage signal, wherein
   the voltage specifying unit sequentially updates the specified voltage signal to be generated,
   a candidate signal generation unit which generates a candidate signal as a candidate of the specified voltage signal after the update by using a low pass filter, and a limit unit which imposes a predetermined limit on the generated candidate signal value so as to generate the specified voltage signal after the update are disposed in the voltage specifying unit, and
   the candidate signal generation unit generates the candidate signal by correcting a signal obtained by passing the specified voltage signal before the update through the low pass filter on the basis of the difference information, or by correcting the specified voltage signal before the update on the basis of the difference information so as to pass the corrected signal through the low pass filter.

10. A motor drive system comprising:

a motor, an inverter which drives the motor, and the motor control device according to claim 9, which controls drive of the motor via the inverter.

11. A motor control device comprising a specifying unit which generates a specified torque current signal indicating a target value of a torque current component of supplied current to a motor or a specified torque signal indicating a target value of a torque generated by the motor on the basis of difference information between a target value of rotation speed of the motor and a detection value or an estimated value of the rotation speed, so as to control the motor in accordance with the specified torque current signal or the specified torque signal, wherein the specifying unit sequentially updates the specified torque current signal or the specified torque signal to be generated, a candidate signal generation unit which generates a candidate signal as a candidate of the specified torque current signal or the specified torque signal after the update by using a low pass filter, and a limit unit which generates the specified torque current signal or the specified torque signal after the update by limiting a value of the generated candidate signal to a predetermined limit value are disposed in the specifying unit, and the candidate signal generation unit generates the candidate signal by correcting a signal obtained by passing the specified torque current signal or the specified torque signal before the update through the low pass filter on the basis of the difference information, or by correcting the specified torque current signal or the specified torque signal before the update on the basis of the difference information so as to pass the corrected signal through the low pass filter.

12. A motor drive system comprising:

a motor, an inverter which drives the motor, and the motor control device according to claim 11, which controls drive of the motor via the inverter.

13. A motor control device comprising an estimation unit which estimates a rotation speed of a motor on the basis of an axial error between a rotation axis synchronizing with rotation of the motor and an estimated axis of the rotation axis, and which generates an estimated speed signal indicating the estimated rotation speed, so as to control the motor by using the estimated speed signal, wherein the estimation unit sequentially updates the estimated speed signal to be generated, a candidate signal generation unit which generates a candidate signal as a candidate of the estimated speed signal after the update by using a low pass filter, and a limit unit which limits a value of the generated candidate signal to a predetermined limit value so as to generate the estimated speed signal after the update are disposed in the estimation unit, and the candidate signal generation unit generates the candidate signal by correcting a signal obtained by passing the estimated speed signal before the update through the low pass filter on the basis of the axial error, or by correcting the estimated speed signal before the update on the basis of the axial error so as to pass the corrected signal through the low pass filter.

14. A motor drive system comprising:

a motor, an inverter which drives the motor, and the motor control device according to claim 13, which controls drive of the motor via the inverter.

* * * * *